(12) United States Patent
Haddock

(10) Patent No.: US 7,987,168 B2
(45) Date of Patent: Jul. 26, 2011

(54) METHOD FOR MANAGING INFORMATION

(76) Inventor: James Walter Haddock, Shelton, CT (US)

(*) Notice: Subject to any disclaimer, the term of this patent is extended or adjusted under 35 U.S.C. 154(b) by 240 days.

(21) Appl. No.: 11/399,851

(22) Filed: Apr. 8, 2006

(65) Prior Publication Data

US 2007/0260698 A1    Nov. 8, 2007

(51) Int. Cl.
*G06F 17/00* (2006.01)

(52) U.S. Cl. ........ 707/706; 707/707; 707/708; 707/791; 707/728

(58) Field of Classification Search .......... 707/706–708, 707/791, 728
See application file for complete search history.

(56) References Cited

U.S. PATENT DOCUMENTS

| | | |
|---|---|---|
| 6,483,523 B1 | 11/2002 | Feng |
| 6,842,755 B2 | 1/2005 | Maslov |
| 2002/0026440 A1* | 2/2002 | Nair .................................. 707/3 |
| 2002/0054084 A1 | 5/2002 | Udell |
| 2003/0023425 A1 | 1/2003 | Pentheroudakis et al. |
| 2003/0080995 A1 | 5/2003 | Tenenbaum et al. |
| 2003/0080996 A1 | 5/2003 | Lavin et al. |
| 2004/0249795 A1* | 12/2004 | Brockway et al. ................ 707/3 |
| 2004/0260679 A1* | 12/2004 | Best et al. .......................... 707/3 |
| 2005/0229106 A1 | 10/2005 | Labarge et al. |
| 2005/0246651 A1 | 11/2005 | Krzanowski |
| 2005/0257156 A1 | 11/2005 | Jeske et al. |
| 2006/0122972 A1* | 6/2006 | Keohane et al. ................... 707/3 |
| 2007/0073599 A1* | 3/2007 | Perry et al. ....................... 705/27 |

* cited by examiner

*Primary Examiner* — Sana Al Hashemi
(74) *Attorney, Agent, or Firm* — Allen Dyer Doppelt Milbrath & Gilchrist

(57) ABSTRACT

A method for managing the exchange of information is provided, wherein the method includes receiving at least one information location identifier, wherein the at least one information location identifier may be associated with at least one information portal and associating with at least one network browser. The method further includes generating an information location identifier template responsive to the at least one information portal and communicating with the at least one information portal to identify resultant information.

19 Claims, 22 Drawing Sheets

Figure 20

METHOD FOR MANAGING INFORMATION

FIELD OF THE INVENTION

This invention relates generally to a method for managing information and more particularly to a method for managing the exchange of information via a network.

BACKGROUND OF THE INVENTION

One of the most remarkable success stories of recent times is the rapid growth and widespread acceptance of the Internet-based World Wide Web (hereinafter the "Web"). The Web provides both the normal individual and the professional information seeker access to a wealth of information on almost every subject under the sun of both casual and professional interest. Simply by entering keywords into a web browser that works in concert with a web site, an information seeker can search a vast amount of the content on the web, and thereby locate any web pages that match the seeker's query. Unfortunately however, due to the abundance of information that is accessible through the web, information seekers may find that they actually obtain too much information, in fact much more information than they are able to review. For example, an Internet search for the keyword "automobile" using the Google® Internet search engine returned an overwhelming fifty-three million eight hundred thousand related web sites. Even with this vast resource at their disposal, it is doubtful that any person could examine that many web pages.

One method that has been developed to overcome this obstacle involves ranking the web pages based upon criteria. As such, in order to make the results of a search tractable, the browser's presentation of the search results may be limited to a relatively small number of web pages, even though the search engine may have found a larger number of relevant web pages. Furthermore, the pages that are presented are often ranked according to their relevancy to the search using rules that are known and/or defined by the search engine but are often unknown by the searcher. Unfortunately, this method is insufficient because the task of operating the Internet browser is up to the user, meaning that the user must still manually submit queries to one or more sites. Thus, the user has to start the internet browser program and then input a web address (URL) into the location field in order to tell the browser to navigate to a specific site before they can input their query. The user must then repeat this process for every site the user would like to submit a query. Because of these limitations, the typical searcher is unable to gain the full benefit of the wealth of information that is potentially available through the Internet.

Another problem for Internet web 'surfers' involves the time it takes to navigate through web pages. For example, if a user is seeking to obtain information from a particular web site the user has to open a browser, navigate to that web site's home page, provide selection criteria related to a desired query and click on a submission button. In response, a web page containing the information (or links to the information) the user seeks is displayed. This can be a time consuming process especially if the user has to look for multiple pieces of information on several different web sites. Consider the situation where an individual frequently shops on line. When that individual determines that they would like to buy a product, they must open a browser, navigate to an online store and provide selection criteria related to the product they are seeking. As above, if the individual wants to shop for several items or perform comparison shopping for the best prices, they must perform this task as many times as necessary until the individual has obtained all of the items they desired and/or until they are satisfied that they obtained the best price. This can be a very time consuming and frustrating task.

SUMMARY OF THE INVENTION

A method for managing the exchange of information is provided, wherein the method includes receiving at least one information location identifier, wherein the at least one information location identifier may be associated with at least one information portal and associating with at least one network browser. The method further includes generating an information location identifier template responsive to the at least one information portal and communicating with the at least one information portal to identify resultant information.

A method for managing the exchange of information via an information management software application is provided, wherein the method includes receiving at least one information location identifier via the information management software application, wherein the at least one information location identifier is associated with at least one information portal. The method further includes associating the information management software application with at least one network browser. Additionally, the method includes generating an information location identifier template responsive to the at least one information portal and communicating with the at least one information portal via the information management software application to identify resultant information.

A machine-readable computer program code is provided, wherein the program code includes instructions for causing a controller to implement a method for managing the exchange of information. The method for managing the exchange of information includes receiving at least one information location identifier, wherein the at least one information location identifier is associated with at least one information portal and associating with at least one network browser. The method for managing the exchange of information also includes generating an information location identifier template responsive to the at least one information portal and communicating with the at least one information portal to identify resultant information.

BRIEF DESCRIPTION OF DRAWINGS

The foregoing and other features and advantages of the present invention will be better understood from the following detailed description of illustrative embodiments, taken in conjunction with the accompanying drawings in which:

FIG. 20 is a is a screen capture of the Graphical User Interface for implementing the method of FIG. 1;

DETAILED DESCRIPTION OF THE INVENTION

Figure 1:
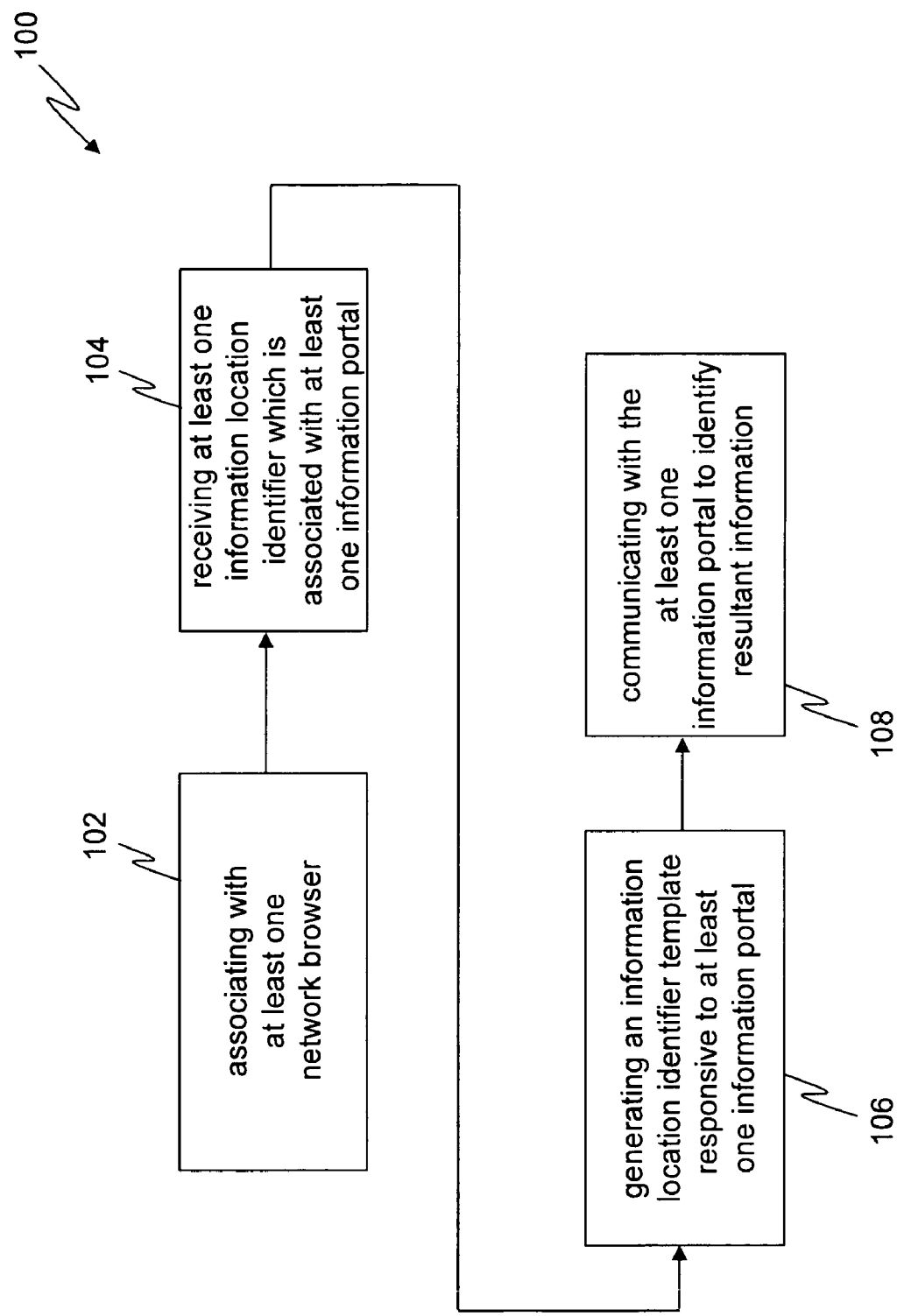
FIG. 1 is a top level block diagram illustrating a method for managing the exchange of information in accordance with an exemplary embodiment.

In accordance with an exemplary embodiment, a method for managing the exchange of information is disclosed herein and described in terms of a software application that sits "on top" of a network access portal, such as an Internet web browser (hereinafter "browser"). The software application may be configured to communicate with any browser that supports automation, wherein as used herein the term automation refers to a program feature defined as the exposure of some or all of the functionality of one program to another to allow for interaction between the programs. The method may facilitate the management of information exchange by allowing a user to access a plurality of information portals (hereinafter "web sites") in simultaneous and/or near simultaneous fashion using a browser management feature as well as an inter web site navigation feature. Once a web site has been associated with the software application, the steps normally required to retrieve desired information from that web site are reduced to introducing data to the software application and activating the software application. The software application then interfaces with a browser to download specific web page(s) displaying desired results responsive to a query. It should be appreciated that the software application may accomplish the above task by 'teaching' itself how to communicate with the web site, as discussed further hereinafter. It should also be appreciated that the invention allows for communication with any type of information portal via the HTTP Post and/or Get methods. However, the software application may be configured to communicate only with web sites that have certain characteristics, such as web sites that expose the user query as part of the Universal Resource Locator (URL) address (i.e. HTTP GET method) to decide which web pages to display.

The method allows for the organization of all web sites into a plurality of categories, including, but not limited to: a Search Engine (SE) category, an Online Store (OS) category, a Billboard (BB) category and an Other (O) category. The SE category may be for any web sites that provide Internet search features, such as Yahoo!®, MSN® and Google®. The OS category may be for any web site that offers products for sale, such as Bestbuy.com, Target.com and Amazon.com. The BB category may be for any web site that allows for information exchange and does not provide any means for the user to search for information or that does not expose the user query as part of the URL address (i.e. HTML Post Method). The O category may be for any web site that does not fit into any of the aforementioned categories. Examples of O category web sites might be dictionary websites, Real Estate web sites, map generation web sites, driving direction web sites and weather forecasting web sites. It is contemplated that the software application may allow a user to associate with uncategorized web sites and/or create other types of categories as desired, wherein each of the user defined categories may have user defined, category specific parameters.

In accordance with an exemplary embodiment, the software application 'teaches' itself to communicate with web sites on an individual basis. This is because for each web site, the query submitted will cause the web site to generate an information location identifier or unique address query string responsive to the query terms submitted. For example, consider the query term "purple jasmine" being submitted to two different Search Engines (SE), Google® and Yahoo!®. Submitting the query term "purple jasmine" to Google® causes Google® to generate the address query string "http://www.google.com/search?hl=en&q=purple+jasmine", whereas submitting the same query to Yahoo!® causes Yahoo!® to generate the address query string "http://search.yahoo.com/search?p=purple+jasmine&fr=FP-tab-web-t&toggle=1&cop=&ei=UTF-8". It should be apparent that, even though the query terms are the same, the address query string generated by Yahoo!® is different from the address query string generated by Google®. Thus, in order for the software application to successfully interact with these web sites, the software application has to be able to submit the query term to the desired web sites in the format specific to the particular web site. As such, when the software application is associated with a web site, the software application must learn how to communicate with the web site. It should be appreciated that an information portal may, at times, modify the format of their address query strings. Additionally, certain information portals (such as Google® Maps) do not display the URL unless the user specifically requests them. As such, the method of the invention allows for the 'retraining' of the software program to accommodate for these situations.

This may be accomplished by generating an information location identifier template or address query string template. For example, while associating the software application with a web site, the software application will prompt the user to input a query term(s) into the web site. The software application will examine the query address string generated by the web site and identify the location of the query term within the address query string as well as identify any information portal separators used to separate the query terms from each other. In the situation above, both Yahoo!® and Google® use the information portal separator "+" to separate the query terms from each other. The software application then generates an address query string template for the web site being associated. For example, the address query string template for Google® would be "http://www.google.com/search?hl=en&q=query term 1+query term 2" and the address query string template for Yahoo!® would be "http://search.yahoo.com/search?p=query term 1+query term 2&fr=FP-tab-web-t&toggle=1&cop=&ei=UTF-8." From thereon after, when the user inputs a query term into the software application for interaction with Yahoo!® and/or Google®, the software application will use the address query string template to generate an appropriate address query string for the web site being engaged. It should be appreciated that in the case, where the web site does not require a query term, such as bulletin board web site, or where the user fails to enter sample query text, the software application may use a default address query string, such as the home page of the web site.

Referring to FIG. 1, a high-level block diagram illustrating a method 100 for managing the exchange of information is illustrated and includes associating with at least one network browser, as shown in operational block 102. As described further hereinafter, this may be accomplished via a software application configured to associate and/or interact with a plurality of web sites via the network browser.

The method 100 further includes receiving at least one information location identifier, as shown in operational block 104, wherein the at least one information location identifier may be associated with at least one information portal via the network browser. It should be appreciated that the information location identifier may be any information location identifier suitable to the desired end purpose, such as Uniform Resource Identifier (URI) addresses, including Uniform Resource Locator (URL), Internet Protocol (IP), File Transfer Protocol (FTP), and Local Machine File (LMF) addresses. As described in more detail hereinabove, an information location identifier template may be generated, as shown in operational block 106, responsive to the information portal associated with the information location identifier. Moreover, the method includes communicating with the information portal to identify resultant information, as shown in operational block 108.

Figure 2:
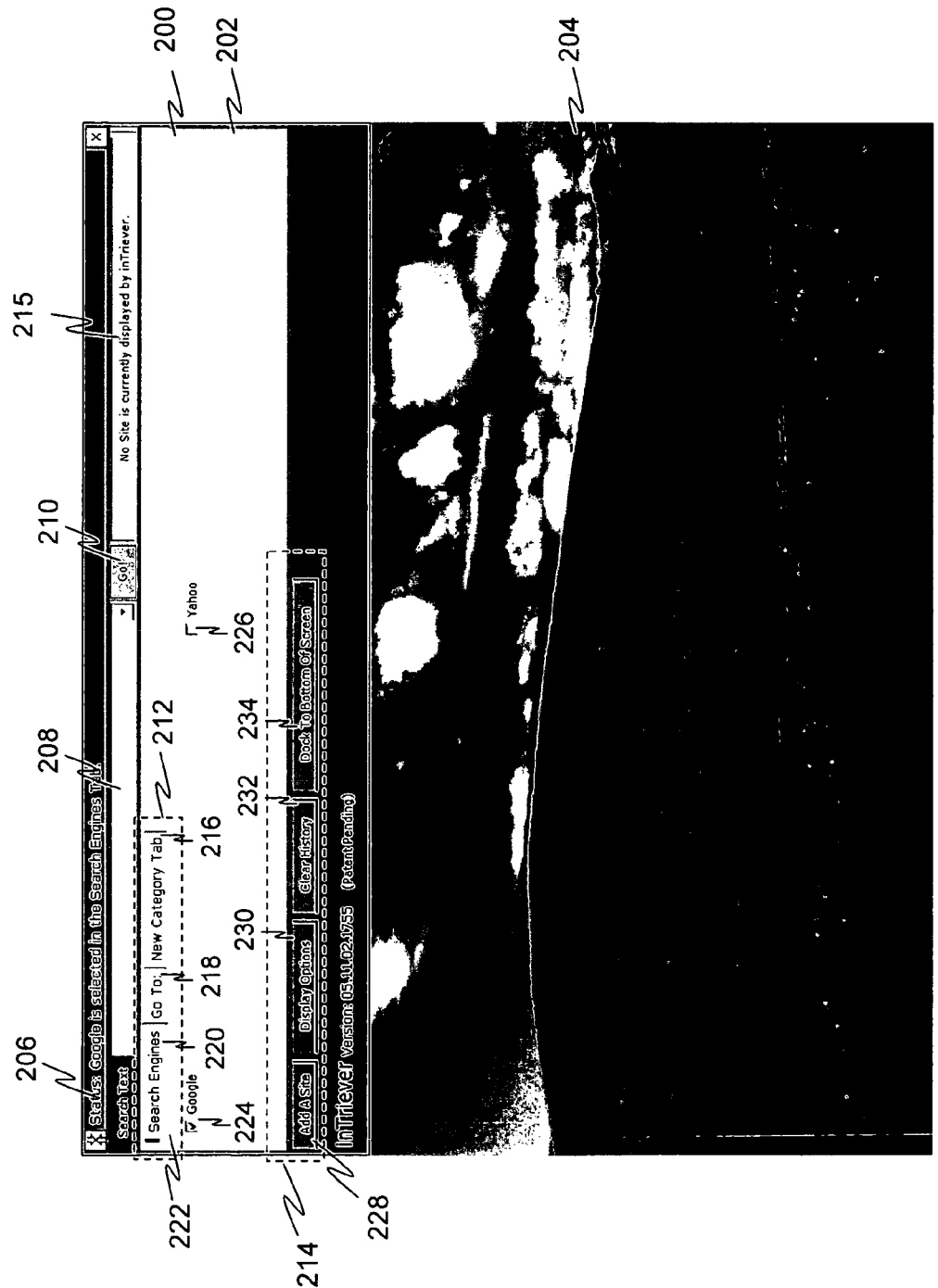
FIG. 2 is a screen capture of the Graphical User Interface generated by the software application for implementing the method of FIG. 1.
Figure 3:
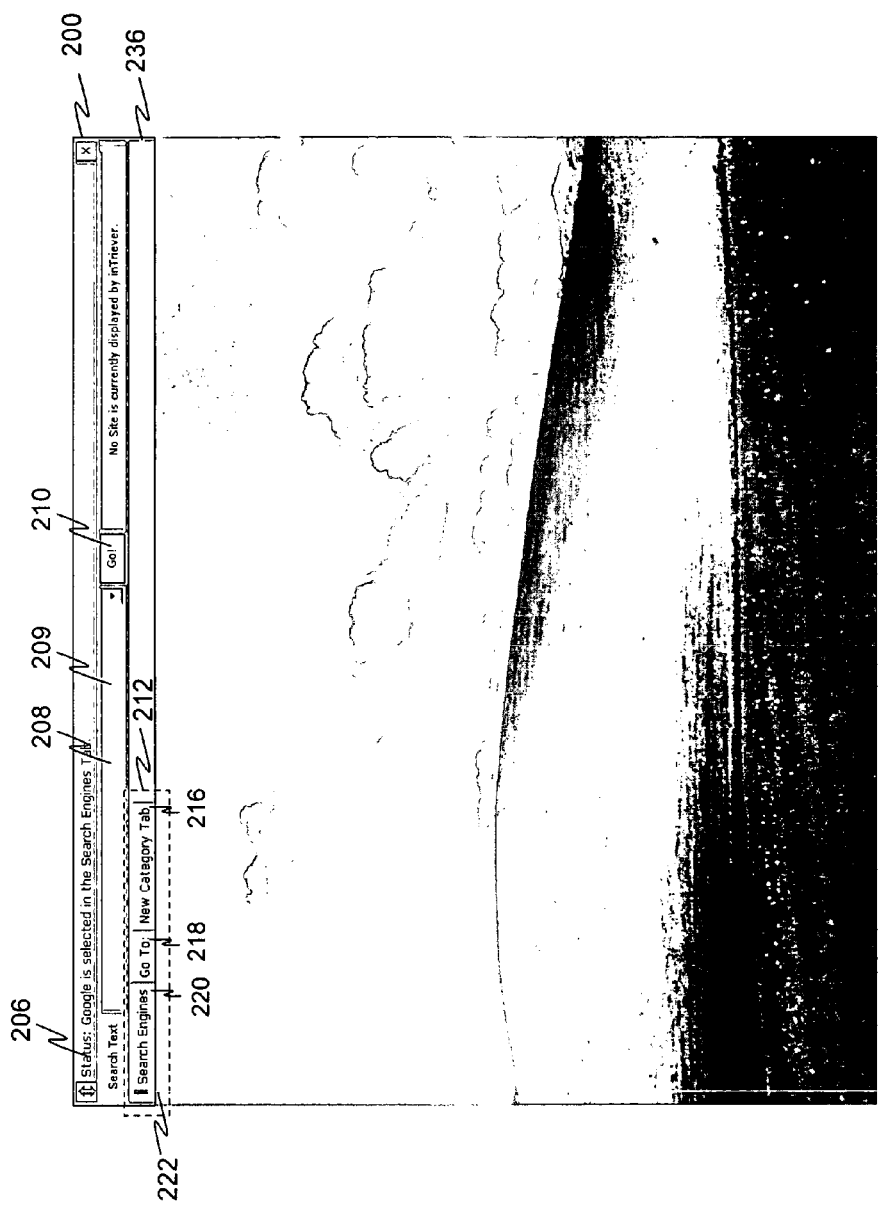
FIG. 3 is a screen capture of the Graphical User Interface for implementing the method of FIG. 1.
Figure 4:
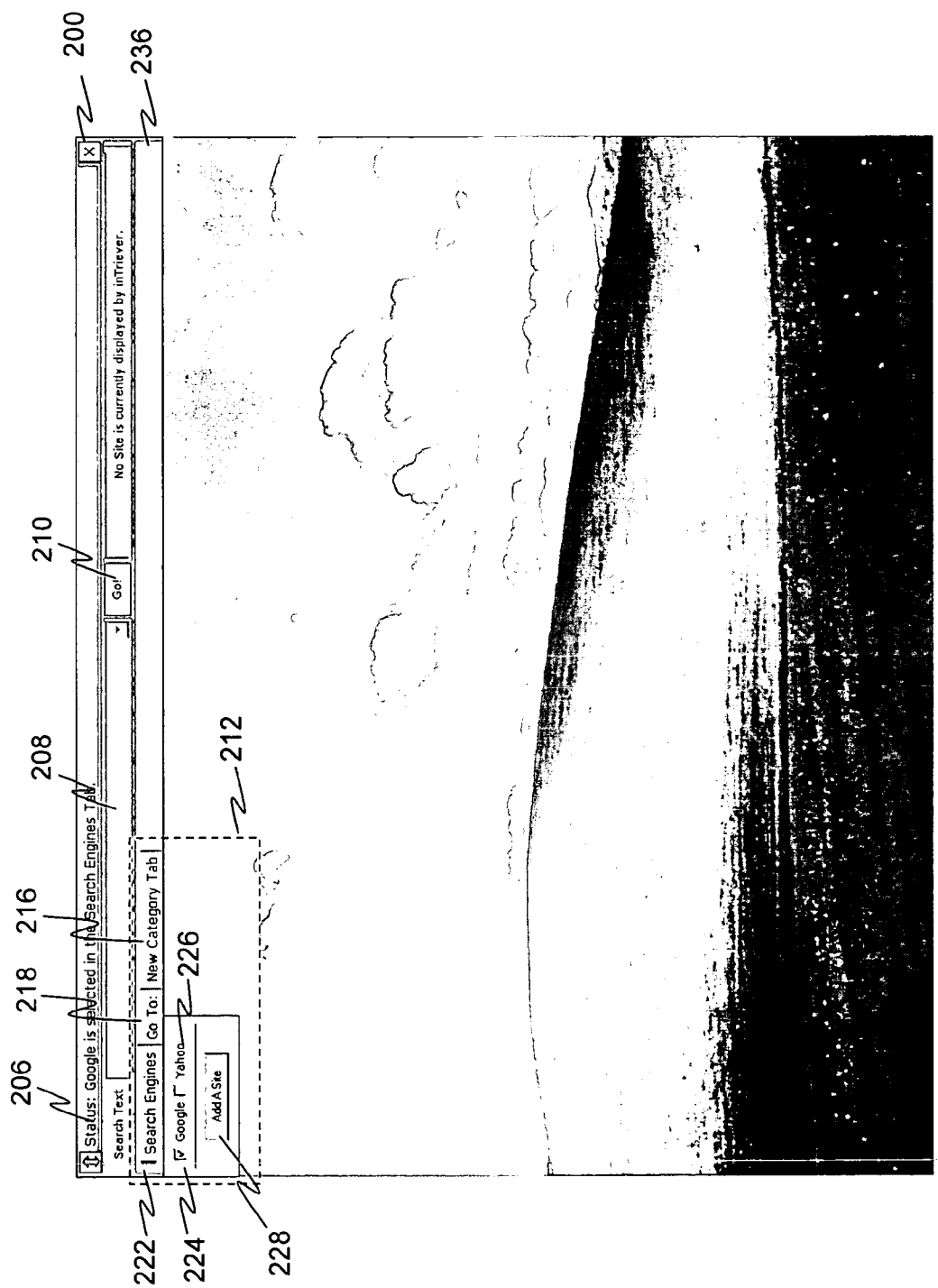
FIG. 4 is a screen capture of the Graphical User Interface for implementing the method of FIG. 1.

By way of several examples described hereinafter, the method 100 is illustrated. However, it should be appreciated that these examples are by no means meant to represent the entire scope of the present invention. Referring to FIG. 2, consider the situation where the software application for implementing the method 100 has been activated, associated with a network browser and a Graphical User Interface (GUI) 200 generated by the software application is shown in an expanded mode 202 displayed on a computer desktop screen 204. In the expanded mode 202, the GUI 200 includes a caption bar portion 206, a text input portion 208, wherein the text input portion 208 may or may not include a text input box 209, a command button 210, an category tab portion 212, a plurality of function buttons 214 and a browser tab portion 215, which identifies the web site being displayed. The category tab portion 212 includes a new category tab 216, a go to tab 218 and a category tab 220 for each existing category that includes an information portal. For example, in this case the software application has been associated with the information portals "Google®" and "Yahoo®", wherein both "Google®" and "Yahoo®" have been assigned to the Search Engine (SE) category. Thus, a search engine category tab 222 has been generated with a selectable "Google®" link 224 and a selectable "Yahoo®" link 226, as will be discussed in more detail hereinafter. The function buttons 214 include an "Add a Site" button 228 for associating the software application with additional information portals, a "Display Options" button 230, a "Clear History" button 232 and a "Docking" button 234. Referring to FIG. 3 and FIG. 4, the GUI 200 may also be displayed in a minimalist mode 236, depending upon the desire of a user. When in the minimalist mode 236, if the user places the mouse pointer over a category tab 220, the content links in the category tab may be displayed. For example, in this case, the selectable "Google®" link 224 and the selectable "Yahoo®" link 226 are displayed when the mouse pointer is placed over the search engines category tab 222.

Figure 5:
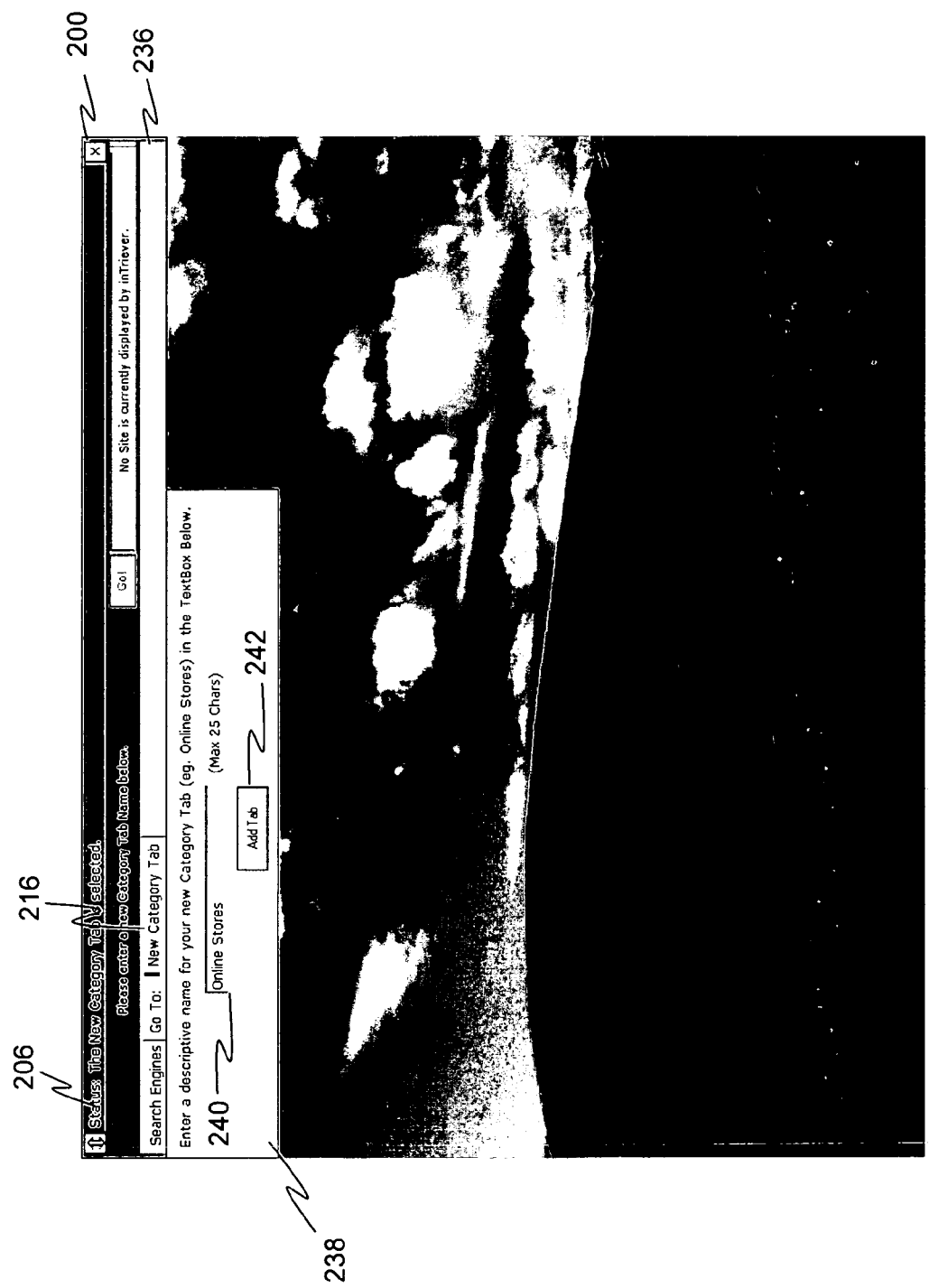
FIG. 5 is a screen capture of the Graphical User Interface for implementing the method of FIG. 1.
Figure 6:
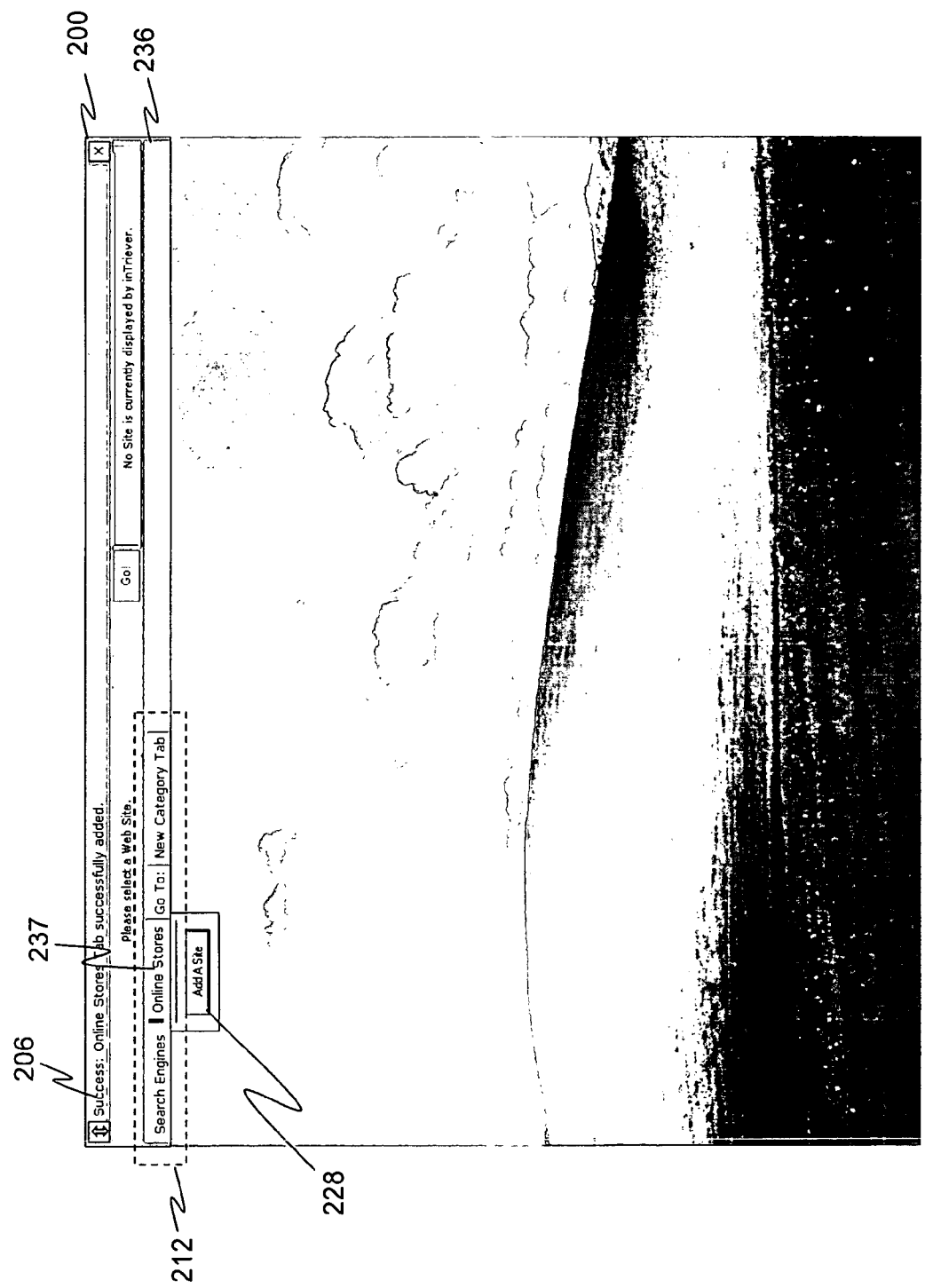
FIG. 6 is a screen capture of the Graphical User Interface for implementing the method of FIG. 1.
Figure 7:
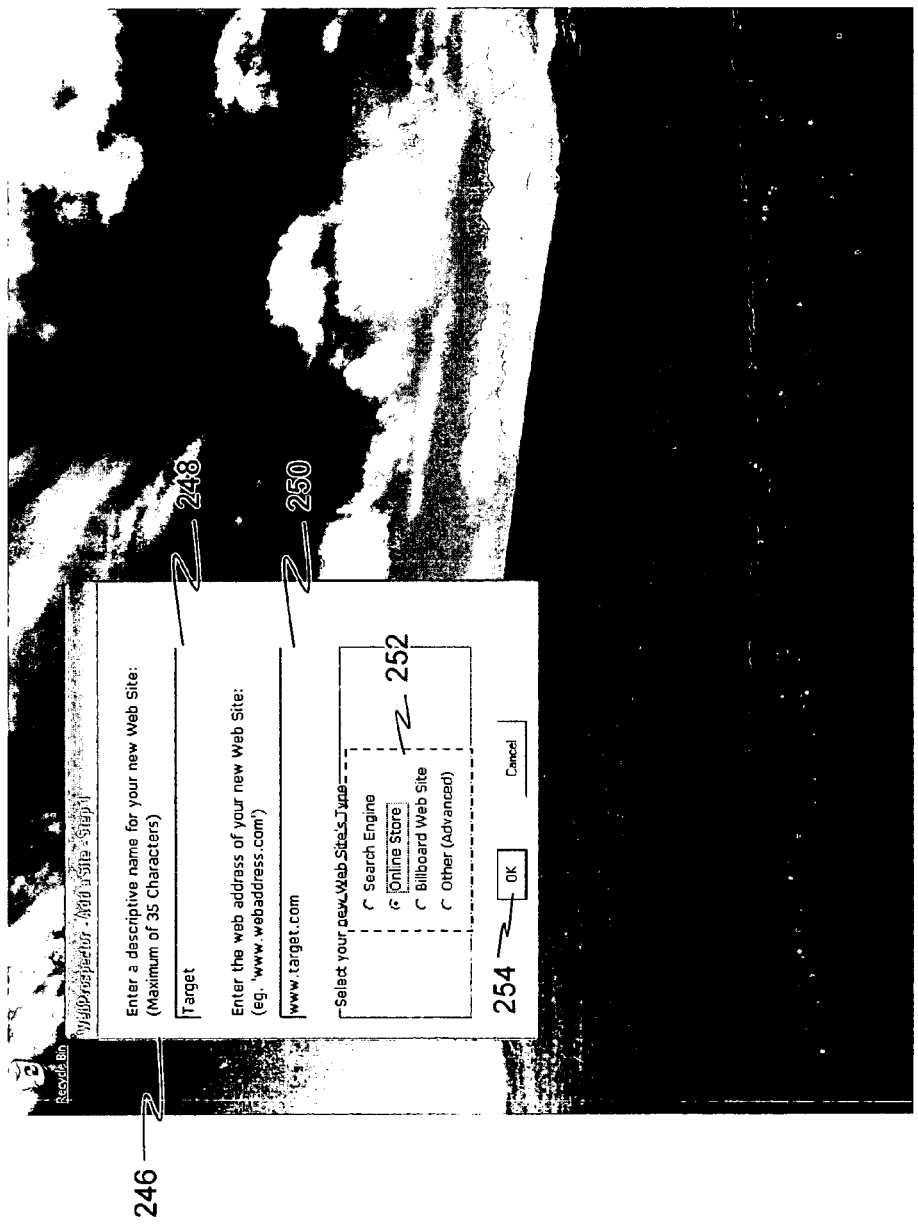
FIG. 7 is a screen capture of the Graphical User Interface for implementing the method of FIG. 1.

In accordance with an exemplary embodiment, a user may create new categories by selecting the "new category" tab 216, as shown in FIG. 5. Upon selection of the "new category" tab 216, a child-GUI 238 having a name field 240 is displayed to the user prompting the user to enter a descriptive name identifying the category to be created. In this case, the descriptive name "Online Stores" was entered into the name field 240. The user selects the "Add Tab" button 242, which then generates and adds an "Online Stores" tab 237 to the category tab portion 212, as shown in FIG. 6. The user may associate an information portal with the category by placing the mouse pointer over the category tab 220, wherein the "Add a Site" button 228 may be displayed to the user. If the user selects the "Add a Site" button 228 the user will be prompted to enter information into the software application regarding the information portal to be associated, as shown in FIG. 7.

For example, consider the situation where the user would like to associate the web site for the department store Target® with the software application. The user places the mouse pointer over the "Online Stores" tab 237 in the category tab portion 212 causing the software application to display the "Add a Site" button 228. The user selects the "Add a Site" button 228 and an input GUI 246 is displayed prompting the user to enter descriptive information into a description input field 248 and the web address of the information portal into an address input field 250, as shown in FIG. 7. In this case, the descriptive name entered is "Target" and the web address is "www.target.com." Additionally, the user may be prompted to select/change the category of the information portal via a plurality of category action buttons 252. The user then selects the "OK" button 254 and the software application communicates with the information portal to verify that the information entered into the input GUI 246 is valid. Once the information has been verified, the web page specified by the user is displayed in a network browser window 256 that has no toolbars, and the software application places a dialog box 258 over the network browser window 256, wherein the dialog box 258 may be moved around the network browser window 256 to allow the input field 260 of the network browser window 256 to be visible and unobstructed. The dialog box 258 prompts the user to enter sample text into the input field 260 of the web page displayed in the network browser window 256 and to select the submission button 262 on the web page.

Figure 8:
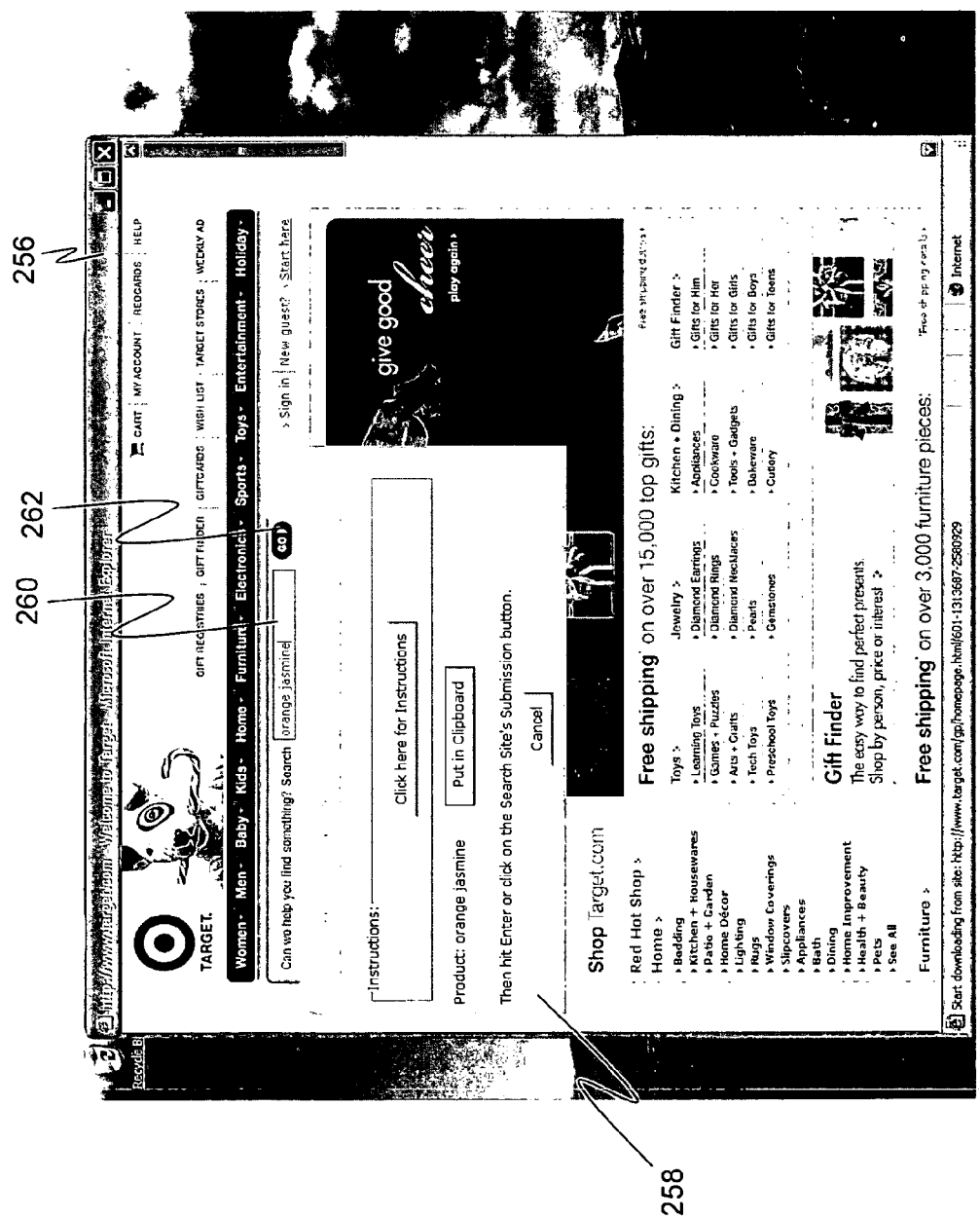
FIG. 8 is a screen capture of the Graphical User Interface for implementing the method of FIG. 1.

The software application then analyzes the web address generated by selecting the submission button 262 on the web page to generate an information location identifier template, as discussed hereinbefore, uniquely responsive to the information portal. For example, referring to FIG. 8, after the information portal associated with the web address "www.target.com" is added to the software application, the user is prompted to enter randomly generated sample text, in this case "orange jasmine" into the web page's input field 260 and activate the submission button 262. The web address associated with the sample text is found to be "http://www.target. com/gp/search.html/ref=sr_bx__1/602-8411649-6824614?field-keywords=orange+jasmine& index=target." The software application analyses this web address generated by selecting the submission button 266 and then generates an information location identifier template uniquely responsive to the web address "www.target.com", as discussed hereinabove. In this case the information location identifier template may be http://www.target.com/gp/search.html/ref=sr_bx__1/602-8411649-6824614?field-keywords=first_term+second_term&index=target." The user may then access the information portal(s) via the software application.

Figure 9:
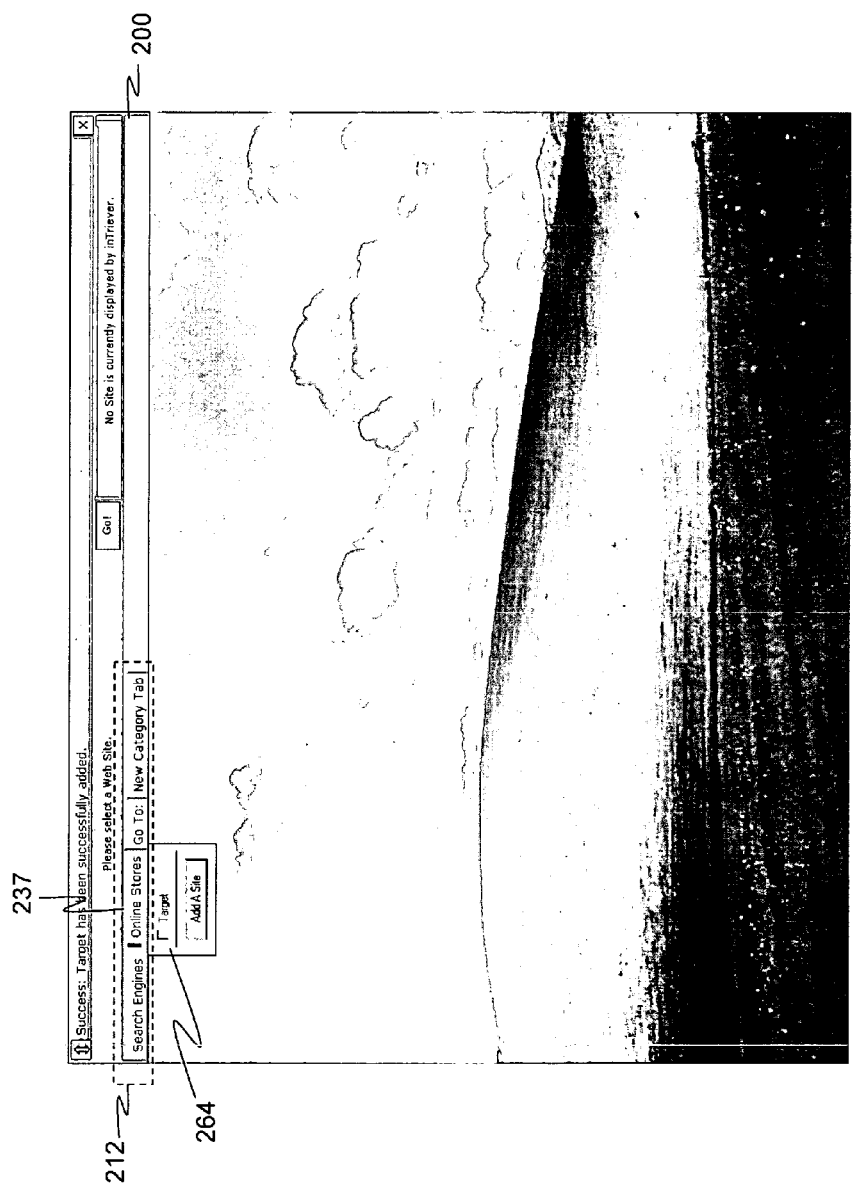
FIG. 9 is a screen capture of the Graphical User Interface for implementing the method of FIG. 1.
Figure 10:
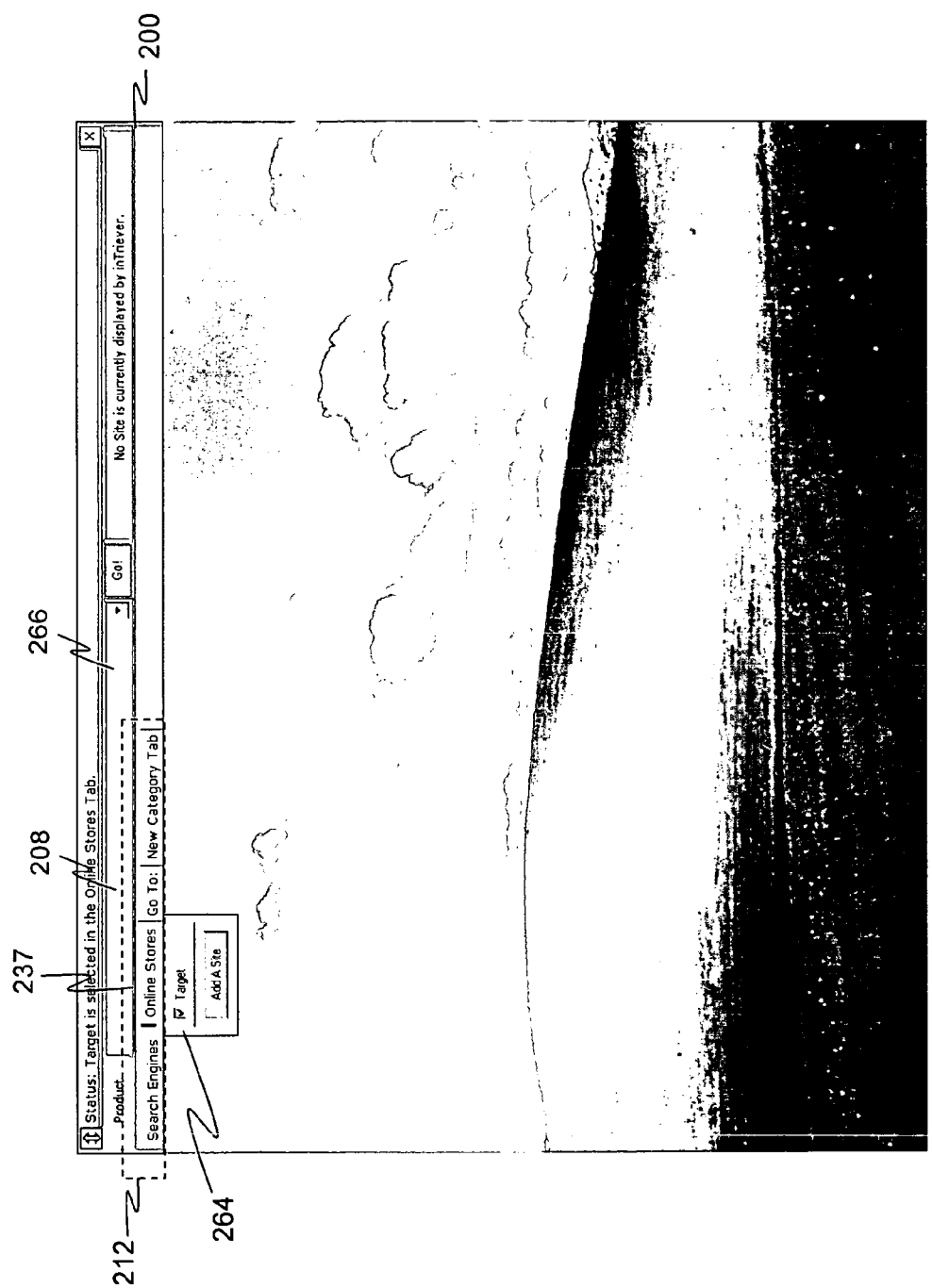
FIG. 10 is a screen capture of the Graphical User Interface for implementing the method of FIG. 1.
Figure 11:
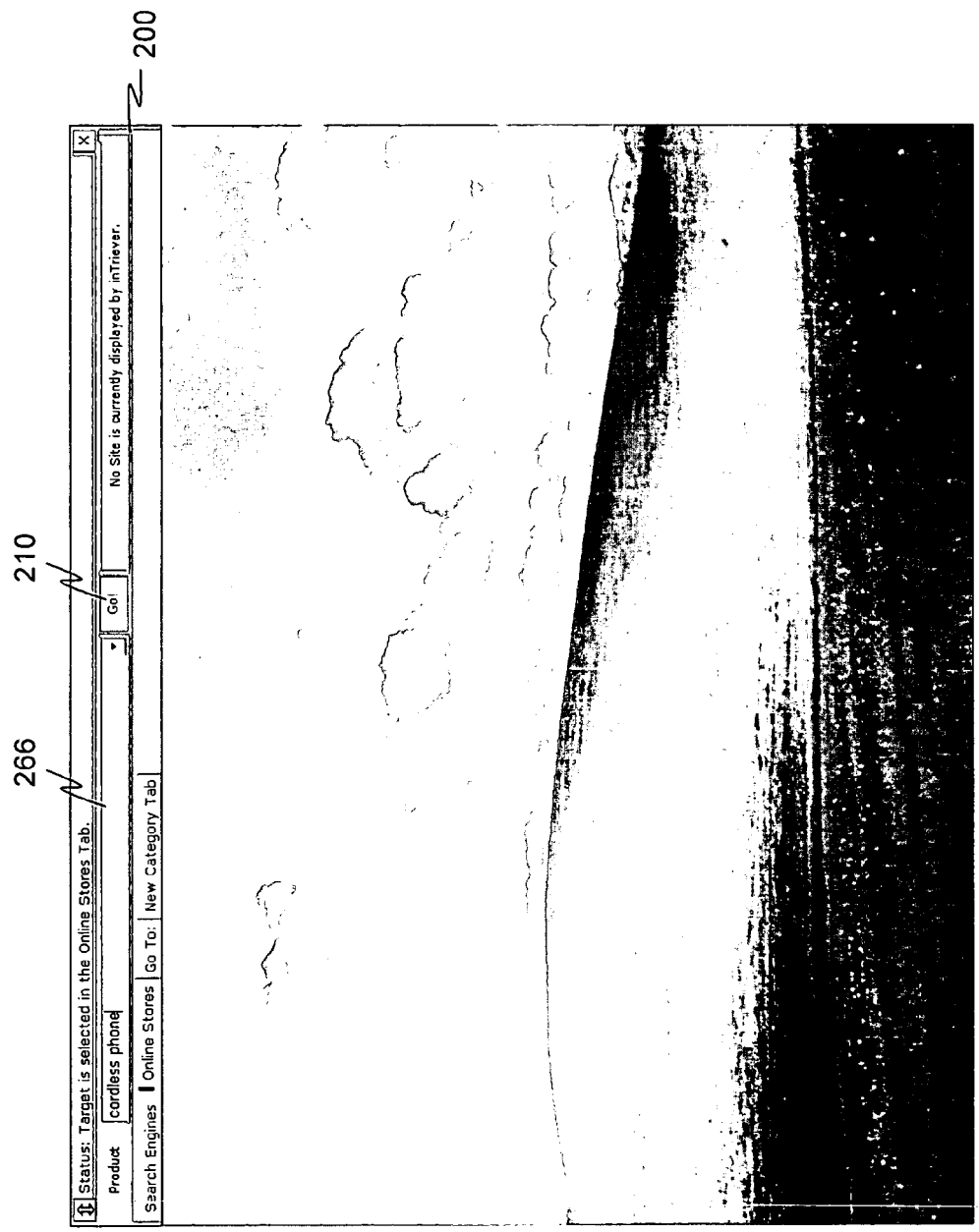
FIG. 11 is a screen capture of the Graphical User Interface for implementing the method of FIG. 1.
Figure 12:
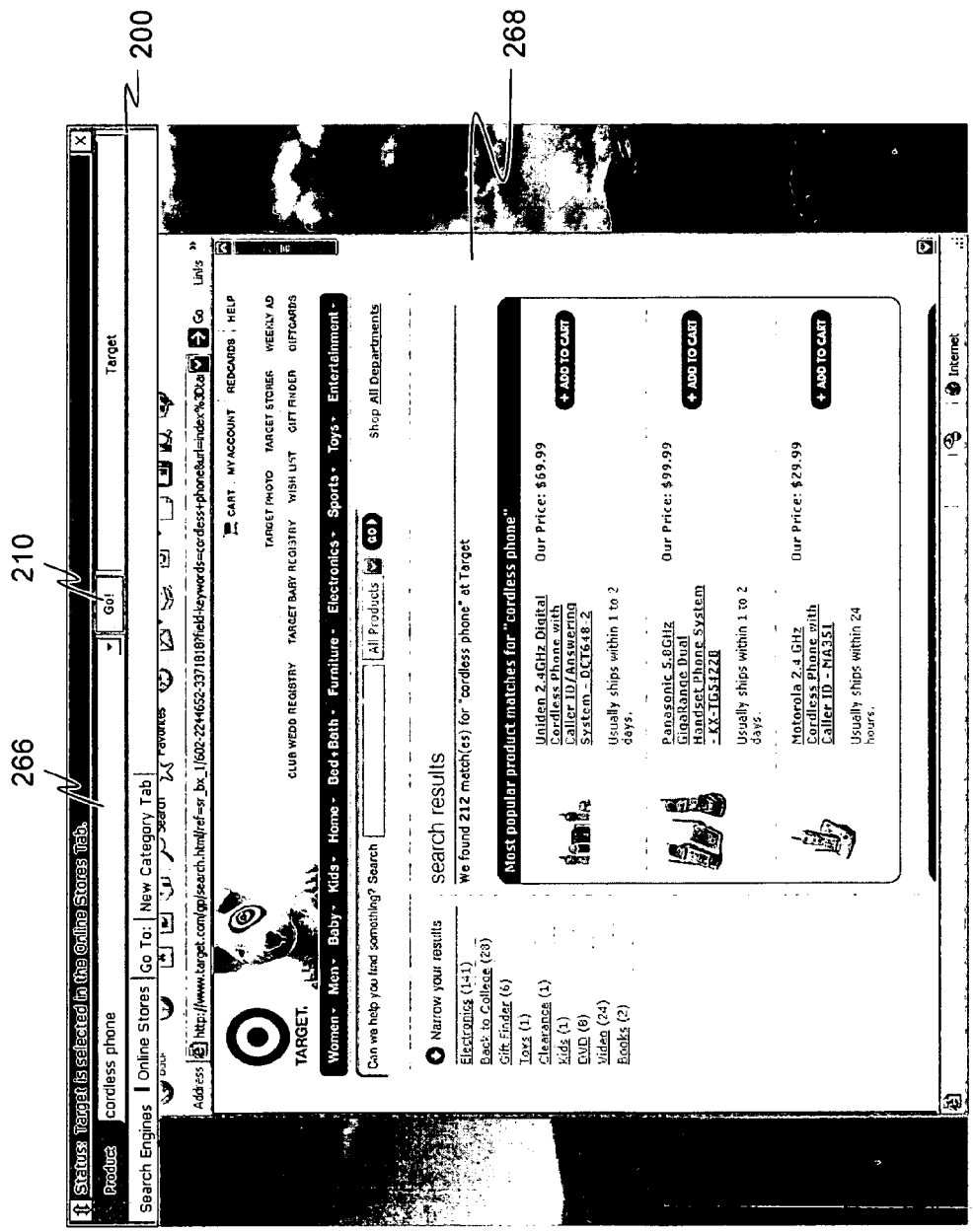
FIG. 12 is a screen capture of the Graphical User Interface for implementing the method of FIG. 1.

Referring to FIG. 9, this may be accomplished by activating the software application such that the Graphical User Interface (GUI) 200 is shown in either its minimalist mode 236 or its expanded mode 202. The user may then select the web site(s) to access by placing the mouse pointer over the appropriate category tab 212 such that the available web site(s) associated with that category are displayed. For example, the user has selected the Online Stores (OS) category tab 237 and the available web site (i.e. Target) associated with that category tab is displayed as a selectable "Target®" link 264. It should be appreciated that if the Online Stores (OS) category included more available web sites, each of those web sites would be displayed along side the selectable "Target®" link 264 via selectable web site links. The user may then select the selectable "Target®" link 264, as shown in FIG. 10. At this point a GUI query input field 266 is displayed in the text input portion 208, wherein the GUI query input field 266 is associated with the web page's input field 260 of the Target® web site and the command button 210 is associated with the web site's submission button 262. Referring to FIG. 11, the user may input a query text into the GUI query input field 266 and select the command button 210. As discussed hereinabove, the software application generates a query address string responsive to the query text and communicates that query address string to the web site via the network browser. For example, if the user enters the query text "cordless phone", the query address string generated using the information location identifier template may be "http://www.target.com/gp/search.html/ref=sr_bx_1/602-8411649-6824614?field-keywords=cordless+phone&index=target." The Target® web site generates resultant information responsive to the query text and displays the resultant information to the user via a network browser window 268, as shown in FIG. 12.

Figure 13:
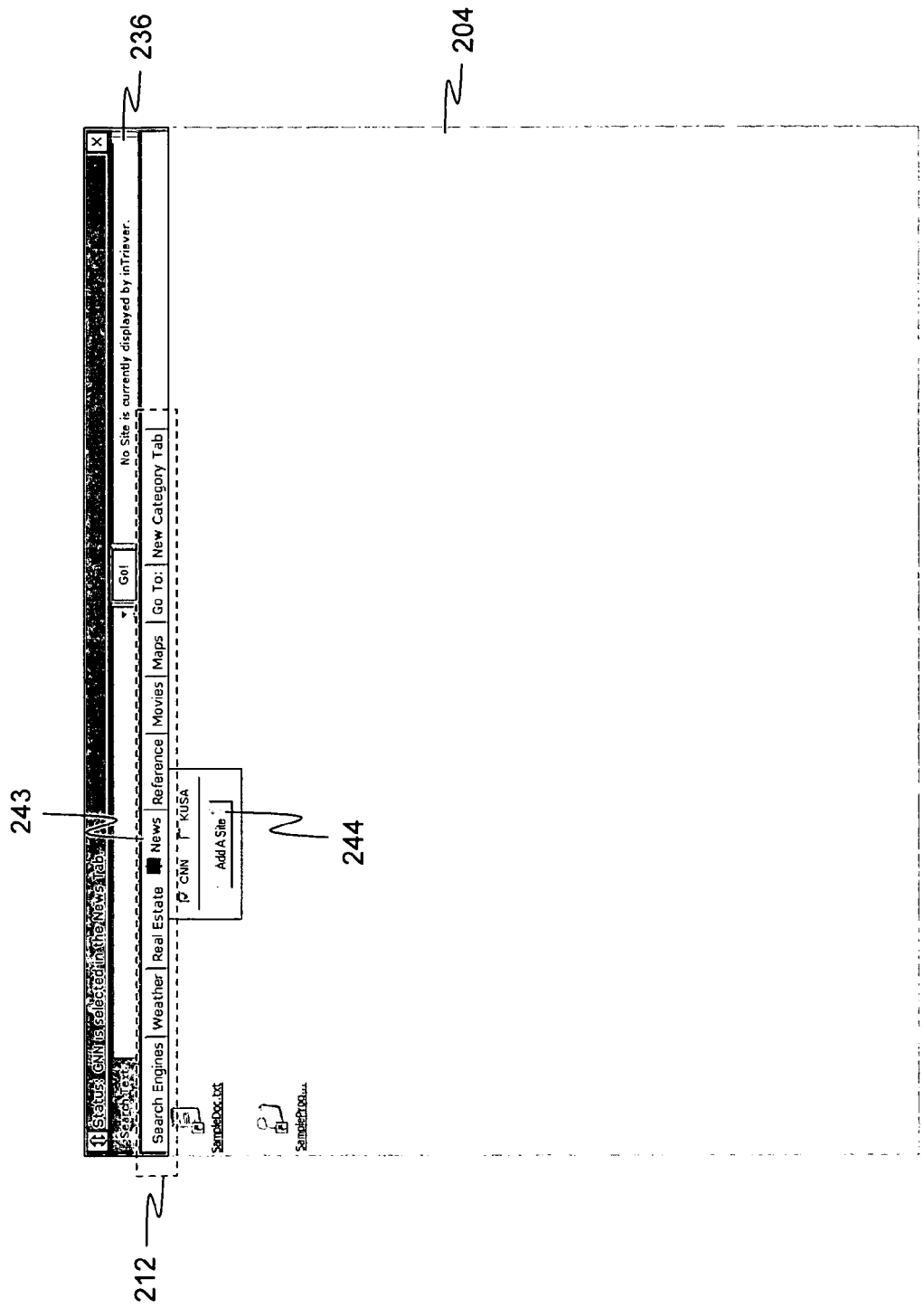
FIG. 13 is a is a screen capture of the Graphical User Interface for implementing the method of FIG. 1.
Figure 14:
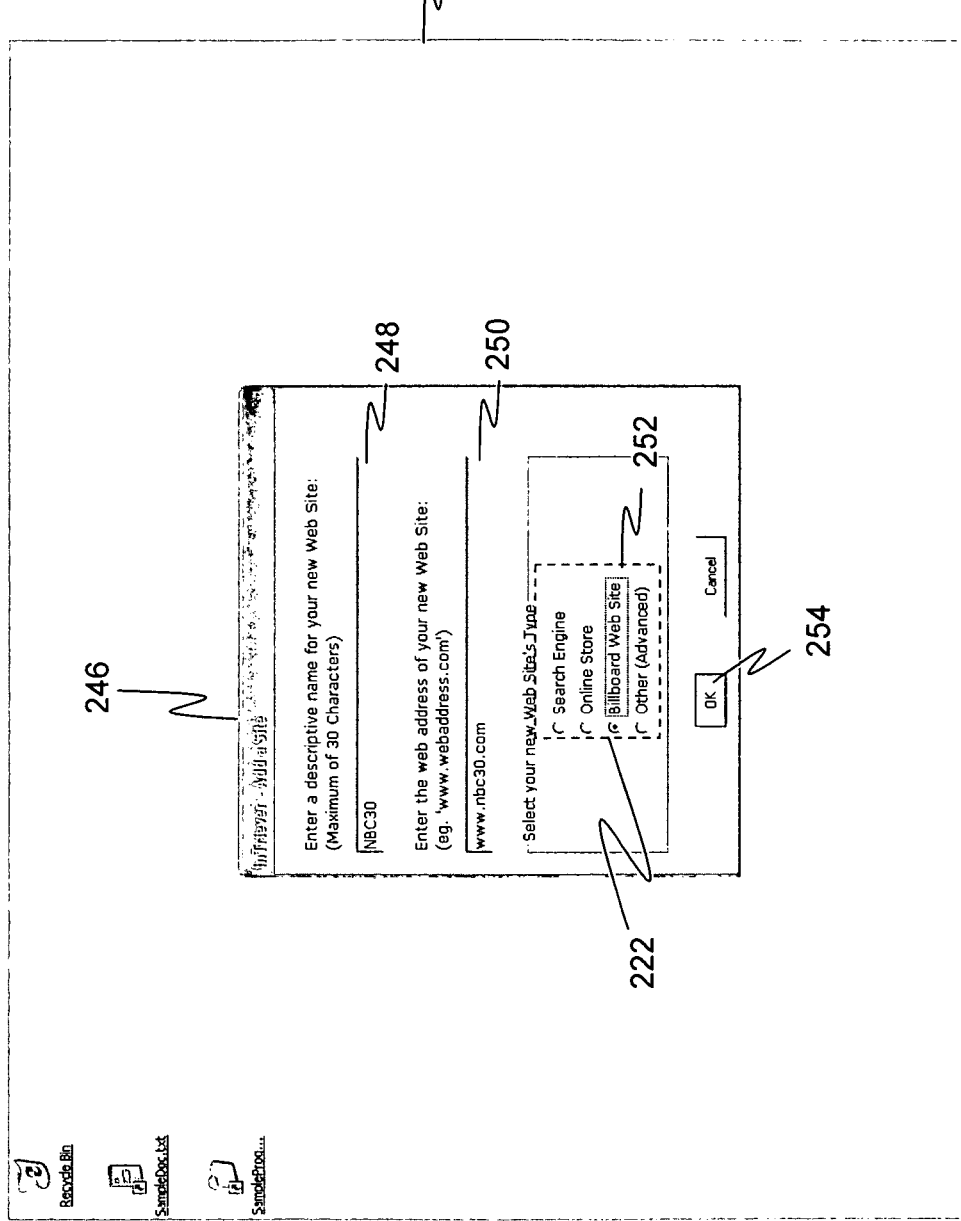
FIG. 14 is a is a screen capture of the Graphical User Interface for implementing the method of FIG. 1.

As another example, consider the situation where the user wants to add a billboard site to a specific category, such as a news category. Referring to FIG. 13, the computer desktop screen 204 is shown with the software application for implementing the method 100 activated and displayed in its minimalist mode 236, wherein the software application includes a plurality of category tabs generated as discussed hereinabove. To add a billboard site to the news category, the user may place the mouse pointer over the "News" category tab 243 in the category tab portion 212 causing the software application to display the "Add a Site" button 228 for the "News" category tab 243. The user may then select the "Add a Site" button 228 and an input GUI 246 is displayed prompting the user to enter descriptive information into a description input field 248 and the web address of the information portal to be added into an address input field 250, as shown in FIG. 14. In this case, the descriptive name entered is "NBC30" and the web address is "www.nbc30.com." Additionally, the user may be prompted to select/change the category of the information portal via a plurality of category action buttons 252, wherein in this case, the user selects the "billboard" category action button 222. The user then selects the "OK" button 254 and the software application communicates with the information portal to verify that the information entered into the input GUI 246 is valid.

Figure 15:
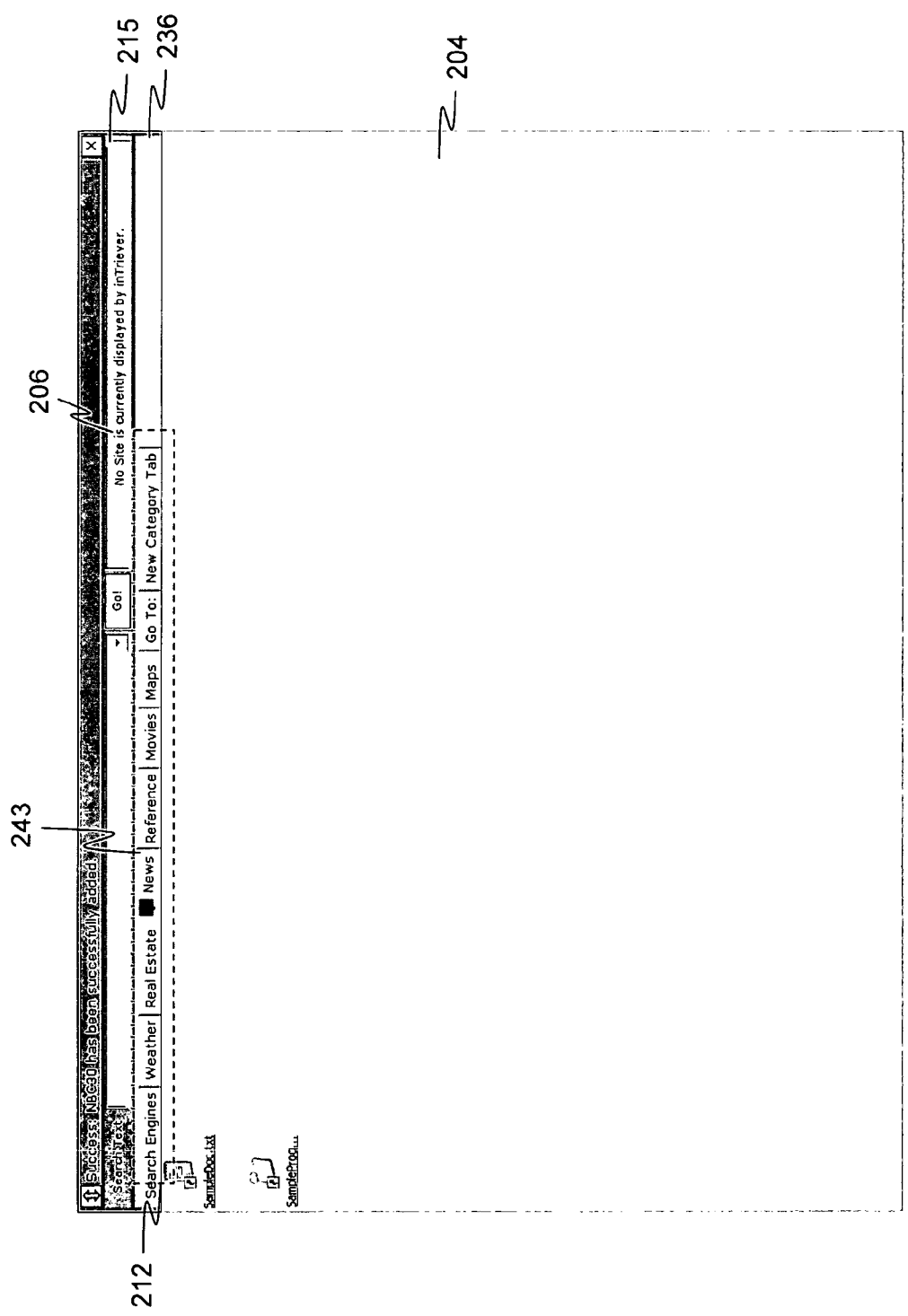
FIG. 15 is a is a screen capture of the Graphical User Interface for implementing the method of FIG. 1.
Figure 16:
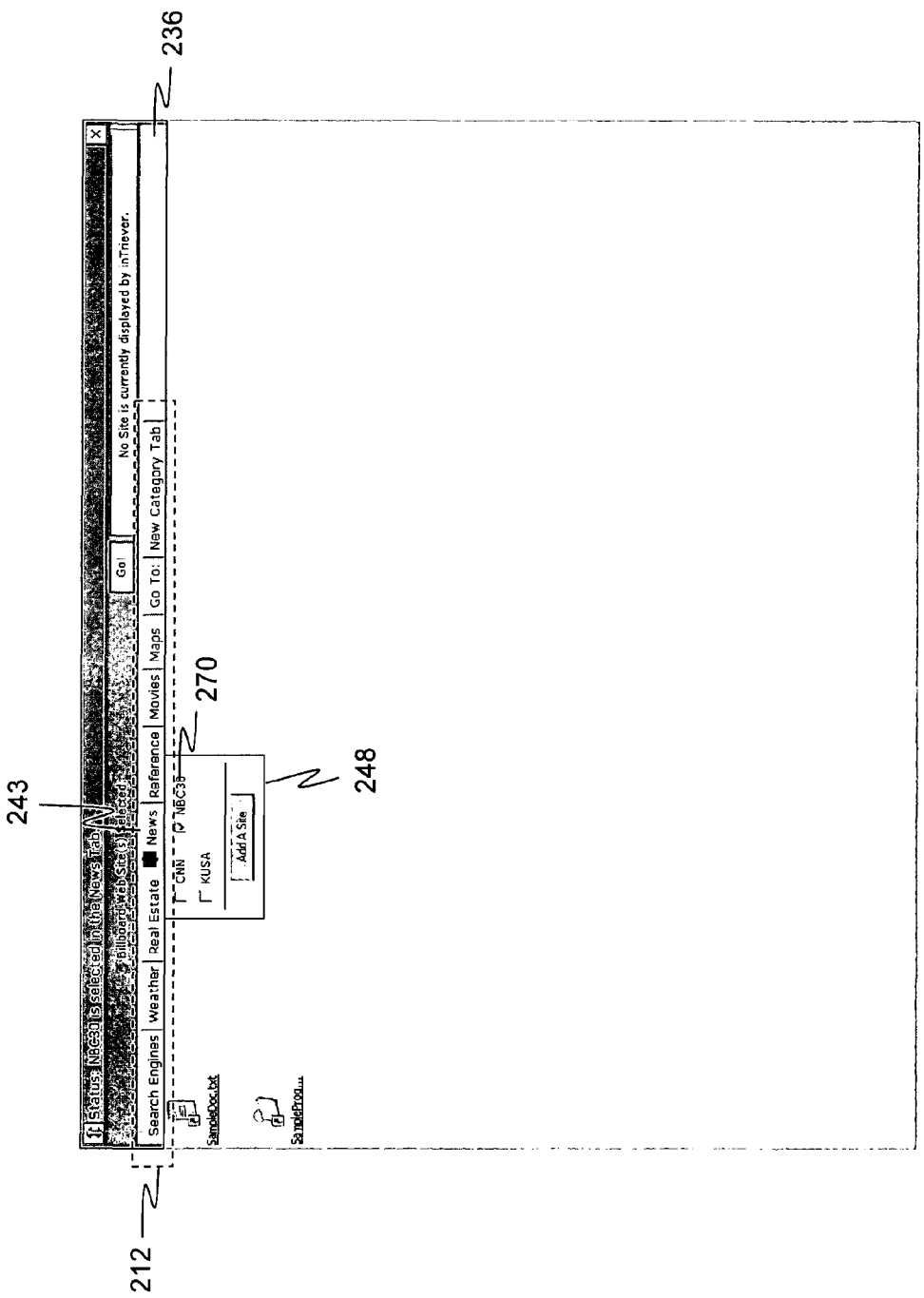
FIG. 16 is a is a screen capture of the Graphical User Interface for implementing the method of FIG. 1.
Figure 17:
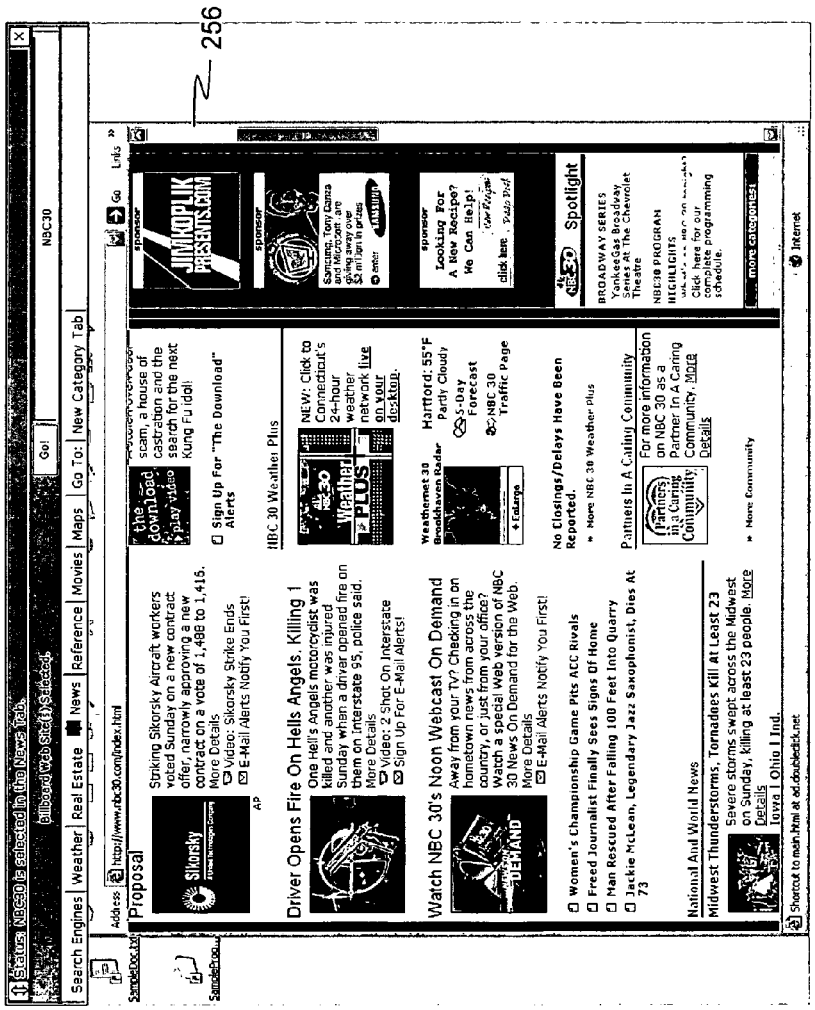
FIG. 17 is a is a screen capture of the Graphical User Interface for implementing the method of FIG. 1.
Figure 18:
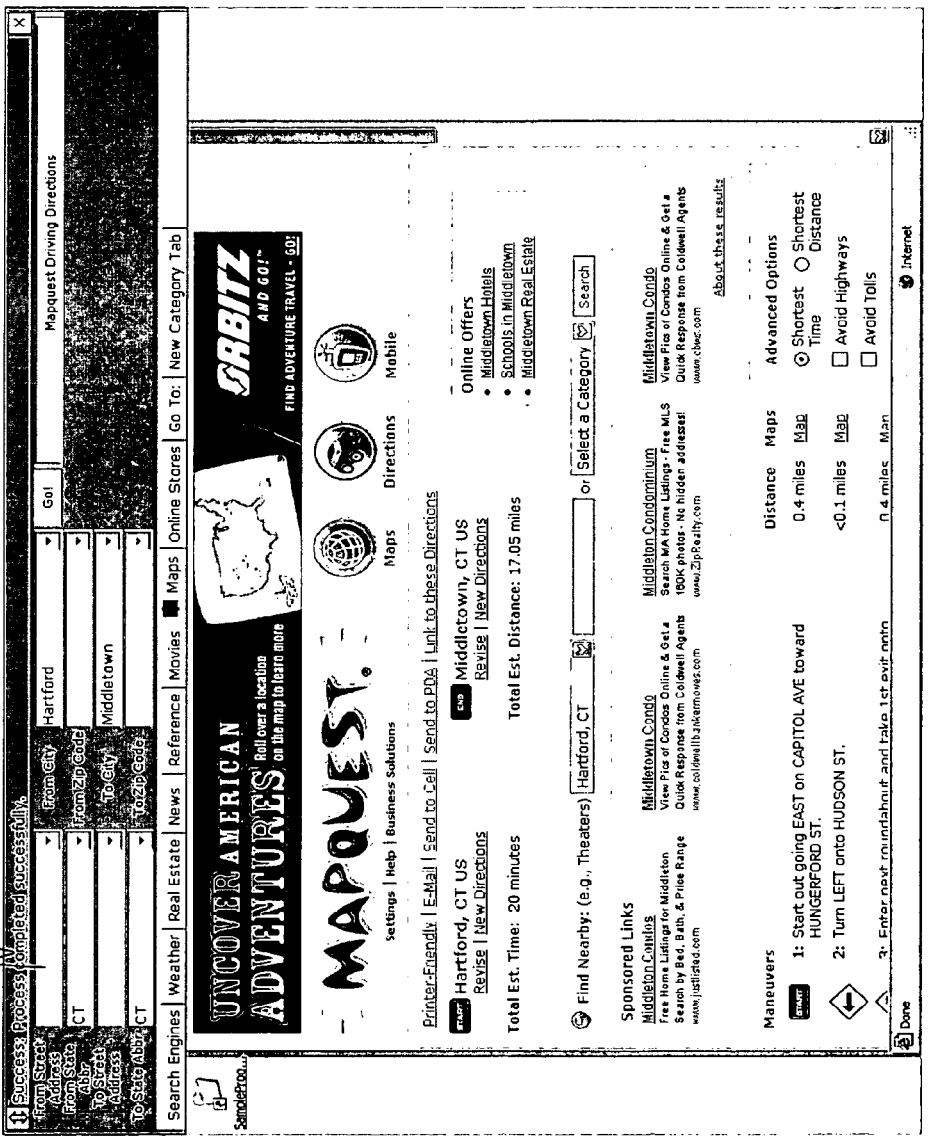
FIG. 18 is a is a screen capture of the Graphical User Interface for implementing the method of FIG. 1.
Figure 19:
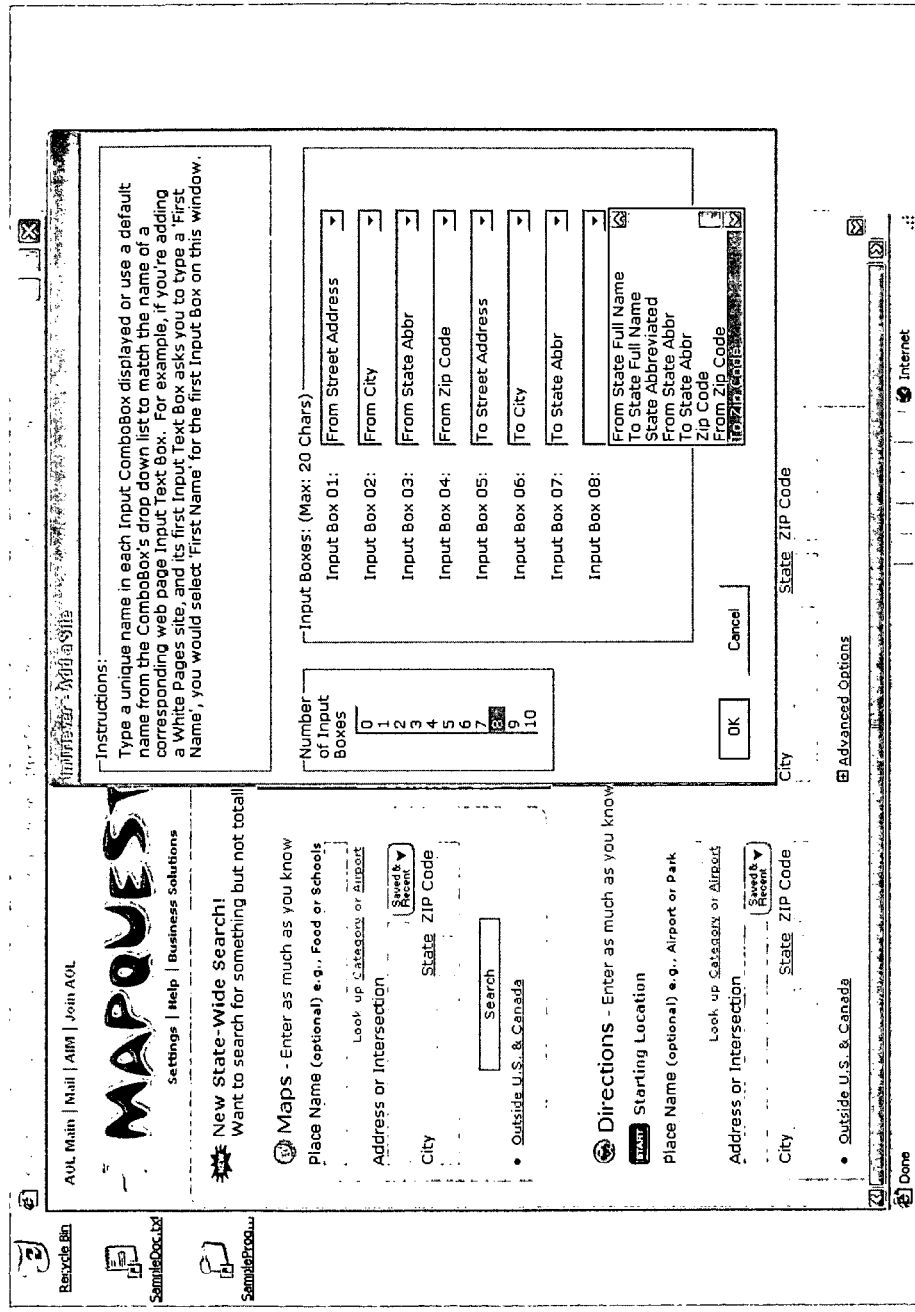
FIG. 19 is a is a screen capture of the Graphical User Interface for implementing the method of FIG. 1.

Once the entered information has been validated, a "success message" may be displayed in the caption bar portion 206 and the user may select the newly added billboard site for display, as shown in FIG. 15. This may be accomplished by again placing the mouse cursor over the "News" category tab 243 in the category tab portion 212 and selecting the "NBC30" action button 270, as shown in FIG. 16. The software application will communicate with the information portal (i.e. www.nbc30.com) associated with the NBC30 billboard action button and display the web site to the user via the browser window 256, as shown in FIG. 17. It should be appreciated that sites that do not have input fields for query text or for sites where the user does not enter query text when prompted, the information location identifier template may be defaulted to a predetermined web page, such as the home page of the newly added information portal. In this case, the default information location identifier template may be "www.nbc30.com." The user may then surf the web site as desired. If the information portal includes a plurality of query fields, then a plurality of query fields 272 may be displayed by the software application for input by the user, as shown in FIG. 18. It should be appreciated that the software application may allow the user to generate and/or configure the plurality of query fields, as shown in FIG. 19, or the software application may automatically generate and/or configure the plurality of query fields 272.

Figure 20:
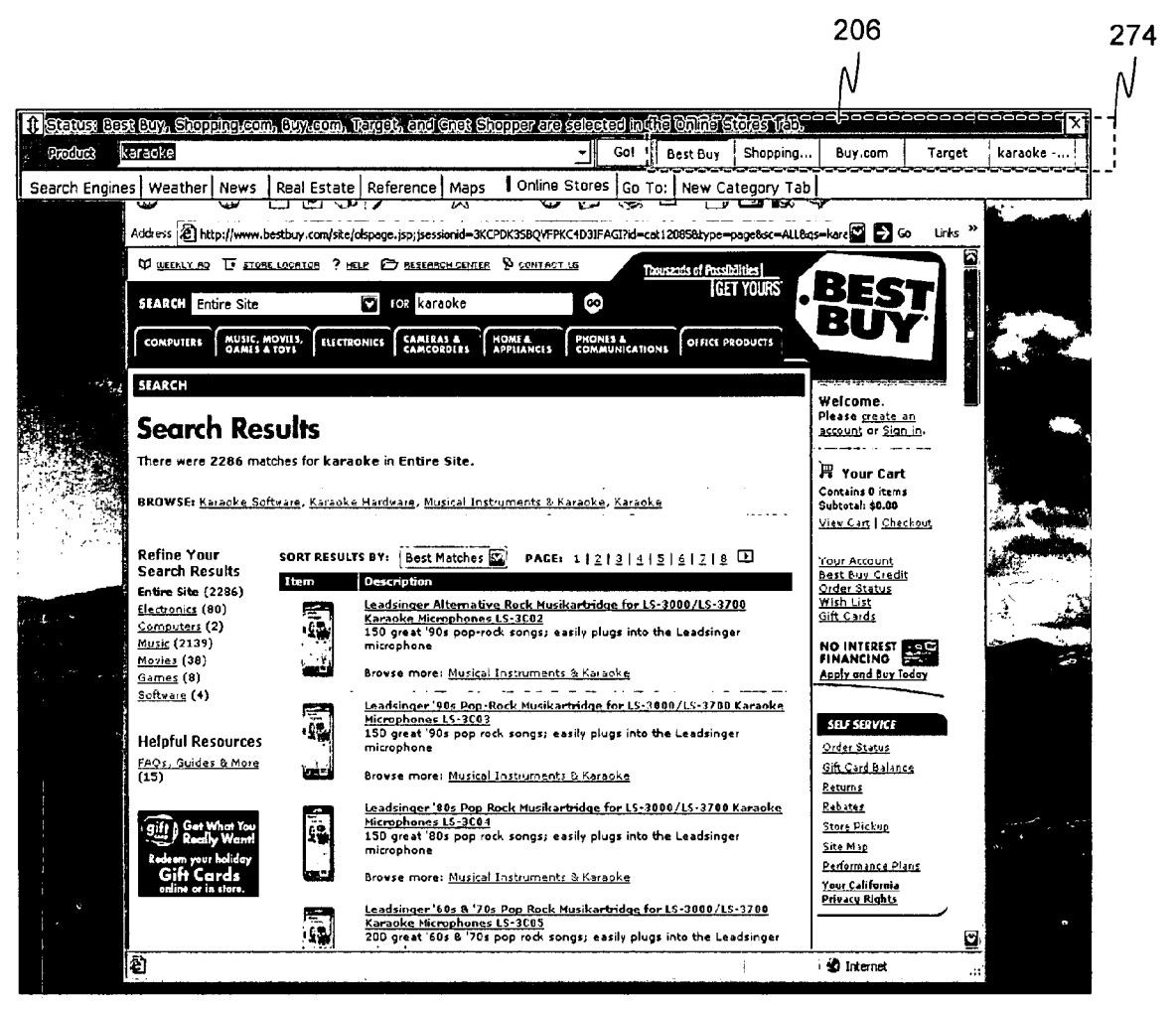
Figure 21:
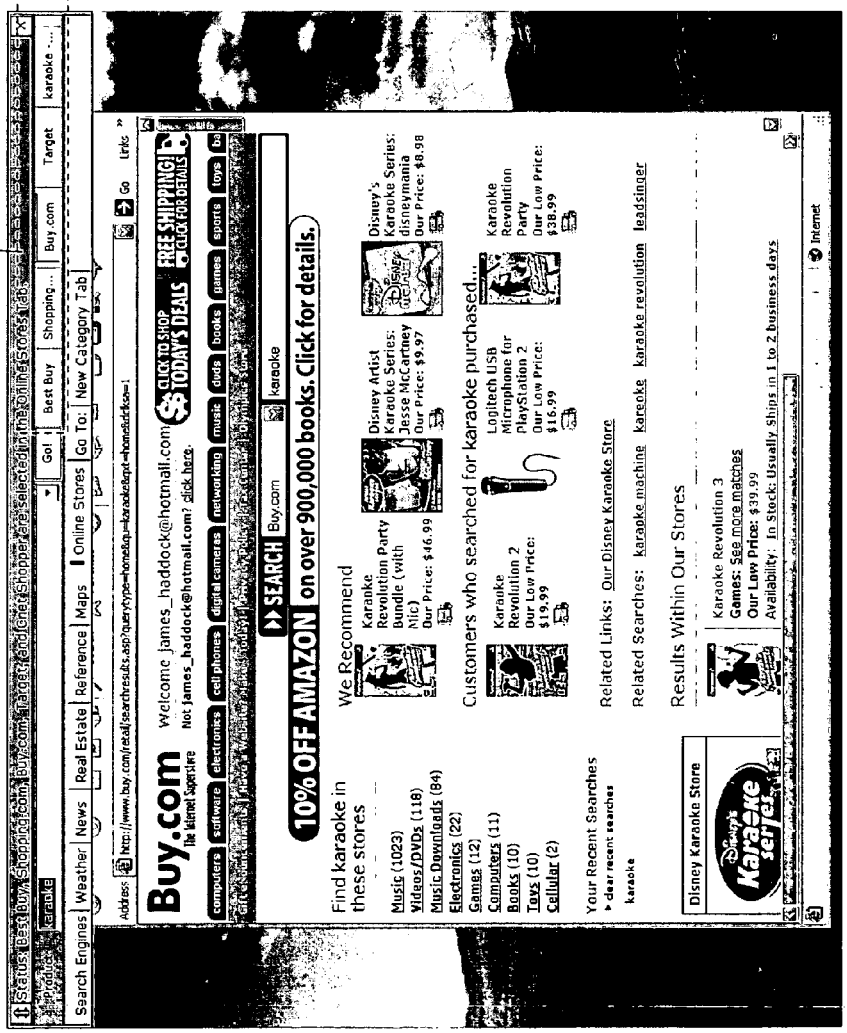
FIG. 21 is a is a screen capture of the Graphical User Interface for implementing the method of FIG. 1.

Consider still yet another example, where the user is searching a plurality of web sites simultaneously or near simultaneously. Referring to FIG. 20 and FIG. 21, consider the situation where the user wants to search a plurality of web sites that have already been associated with an Online Store category tab for "karaoke". The user may place the mouse cursor over the Online Store category tab and select the information portals available under the Online Store category tab. In this case, the information portals associated with Online Store category tab that have been selected include "Best Buy", "Shopping.com", "Buy.com," "Target," and "CNET Shopper." Once these information portals have been selected for query, the user may enter the desired query term into the displayed query field and select the submission button. The software application will then communicate this query term to each of the selected information portals responsive to the predetermined template as discussed in greater detail hereinbefore. Once the desired information has been received from the selected information portals, a portal button 274 is displayed to the user in the browser tab section 214 of the software application, wherein the user may surf between each of the selected information portals simply by selecting the appropriate portal button.

Figure 22:
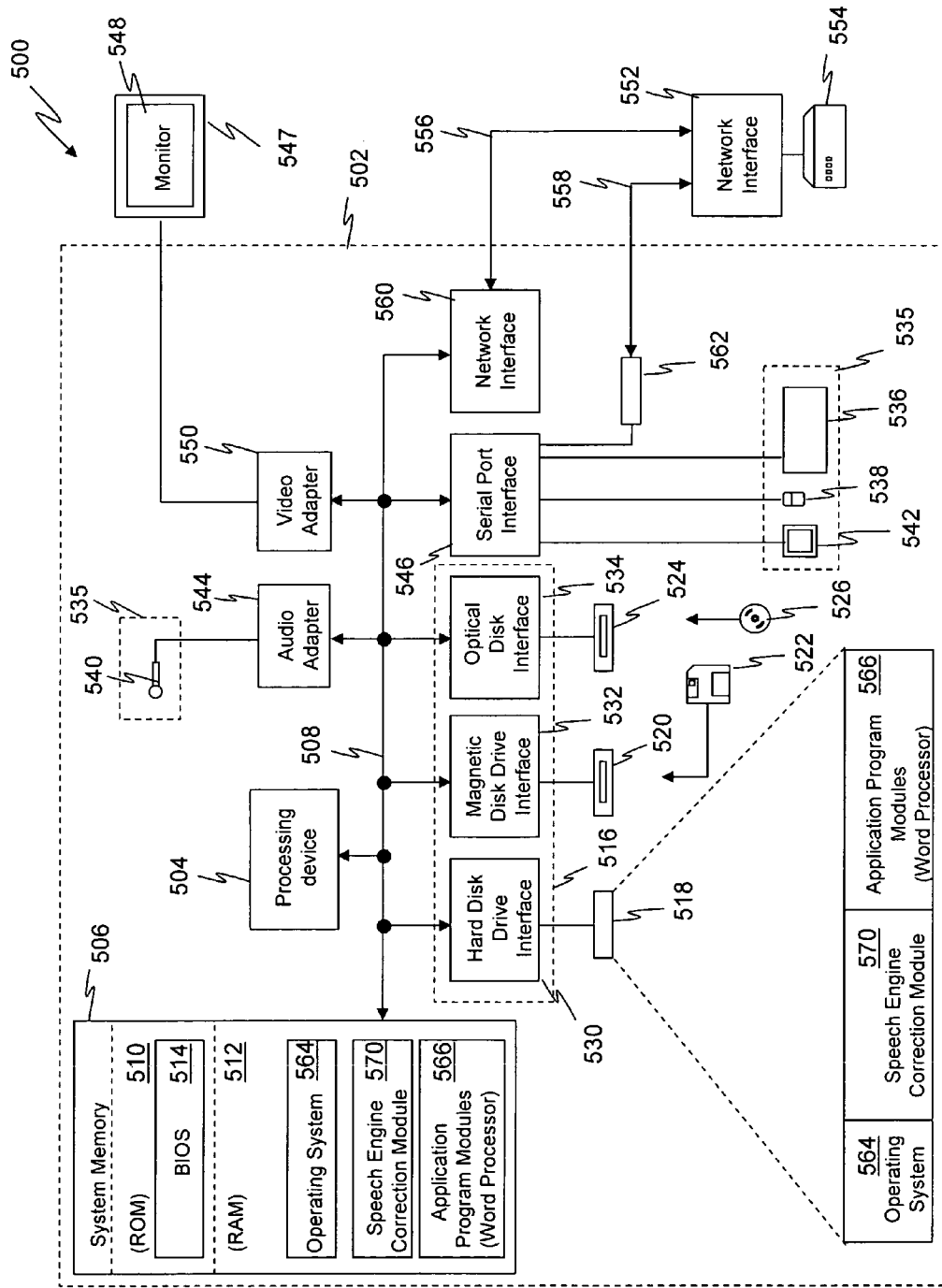
FIG. 22 is a schematic block diagram illustrating a system for implementing the method of FIG. 1.

Referring to FIG. 22, a block diagram illustrating a system 500 for implementing EDMS 100 is shown and includes a general computer system 502, including a processing device 504, a system memory 506, and a system bus 508, wherein the system bus 508 couples the system memory 506 to the processing device 504. The system memory 506 may include read only memory (ROM) 510 and random access memory (RAM) 512. A basic input/output system 514 (BIOS), containing basic routines that help to transfer information between elements within the general computer system 502, such as during start-up, is stored in ROM 510. The general computer system 502 further includes a storage device 516, such as a hard disk drive 518, a magnetic disk drive 520, e.g., to read from or write to a removable magnetic disk 522, and an optical disk drive 524, e.g., for reading a CD-ROM disk 526 or to read from or write to other optical media. The storage device 516 may be connected to the system bus 508 by a storage device interface, such as a hard disk drive interface 530, a magnetic disk drive interface 532 and an optical drive interface 534. The drives and their associated computer-readable media provide nonvolatile storage for the general computer system 502. Although the description of computer-readable media above refers to a hard disk, a removable magnetic disk and a CD-ROM disk, it should be appreciated that other types of media that are readable by a computer system and that are suitable to the desired end purpose may be used, such as magnetic cassettes, flash memory cards, digital video disks, Bernoulli cartridges, and the like.

A user may enter commands and information into the general computer system 502 through a conventional input device 535, including a keyboard 536, a pointing device, such as a mouse 538 and a microphone 540, wherein the microphone 540 may be used to enter audio input, such as speech, into the general computer system 502. Additionally, a user may enter graphical information, such as a drawing or hand writing, into the general computer system 502 by drawing the graphical information on a writing tablet 542 using a stylus. The general computer system 502 may also include additional input devices suitable to the desired end purpose, such as a joystick, game pad, satellite dish, scanner, or the like. The microphone 540 may be connected to the processing device 504 through an audio adapter 544 that is coupled to the system bus 508. Moreover, the other input devices are often connected to the processing device 504 through a serial port interface 546 that is coupled to the system bus 508, but may also be connected by other interfaces, such as a parallel port interface, a game port or a universal serial bus (USB).

A display device 547, such as a monitor or other type of display device 547, having a display screen 548, is also connected to the system bus 508 via an interface, such as a video adapter 550. In addition to the display screen 548, the general computer system 502 may also typically include other peripheral output devices, such as speakers and/or printers. The general computer system 502 may operate in a networked environment using logical connections to one or more remote computer systems 552. The remote computer system 552 may be a server, a router, a peer device or other common network node, and may include any or all of the elements described relative to the general computer system 502, although only a remote memory storage device 554 has been illustrated in FIG. 30. The logical connections as shown in FIG. 30 include a local area network (LAN) 556 and a wide area network (WAN) 558. Such networking environments are commonplace in offices, enterprise-wide computer networks, intranets and the Internet.

When used in a LAN networking environment, the general computer system 502 is connected to the LAN 556 through a network interface 560. When used in a WAN networking environment, the general computer system 502 typically includes a modem 562 or other means for establishing communications over a WAN 558, such as the Internet. The modem 562, which may be internal or external, may be connected to the system bus 508 via the serial port interface 546. In a networked environment, program modules depicted relative to the general computer system 502, or portions thereof, may be stored in the remote memory storage device 554. It should be appreciated that the network connections shown are exemplary and other means of establishing a communications link between the computer systems may be used. It should also be appreciated that the application module could equivalently be implemented on host or server computer systems other than general computer systems, and could equivalently be transmitted to the host computer system by means other than a CD-ROM, for example, by way of the network connection interface 560.

Furthermore, a number of program modules may be stored in the drives and RAM 512 of the general computer system 502. Program modules control how the general computer system 502 functions and interacts with the user, with I/O devices or with other computers. Program modules include routines, operating systems 564, target application program modules 566, data structures, browsers, and other software or firmware components. The method of the present invention may be included in an application module and the application module may conveniently be implemented in one or more program modules, such as a speech engine correction module 570 based upon the methods described herein. The target application program modules 566 may comprise a variety of applications used in conjunction with the present invention. These include any application and/or control having a text field, e.g. an email application, a word processor program (such as Microsoft® Word, produced by Microsoft Corporation of Redmond, Wash.), a handwriting recognition program module, the speech engine correction module 570, and an input method editor (IME).

As described above, the methods and embodiments described hereinabove and in the several Figures may be embodied in the form of computer-implemented processes and apparatuses for practicing those processes. The methods and embodiments described hereinabove and in the several Figures may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Existing systems having reprogrammable storage (e.g., flash memory) may be updated to implement the invention. The methods and embodiments described hereinabove and in the several Figures may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments may configure the microprocessor to create specific logic circuits.

It should be further appreciated that the methods and embodiments described hereinabove may be practiced via any device suitable to the desired end purpose, such as a PDA, a PC and/or a Cell phone with networking capabilities.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for retrieving search results pages generated by a plurality of web sites, each of the plurality of web sites allowing entry of query terms, generating corresponding address query strings, and generating the search results pages in response to the address query strings, the address query strings including the query terms and additional terms specific to each web site, the method comprising:

receiving, in a software application distinct from the plurality of web sites, a selection of at least one of the plurality of web sites from which a search results page is to be retrieved;

receiving, in the software application, at least one query term;

generating, in the software application, at least one address query string including the at least one query term and additional terms specific to the at least one web site selected;

communicating the at least one address query string to the at least one web site; and displaying the search results page generated by the at least one web site retrieved in response to the at least one address query string;

wherein the search results page generated by the at least one web site is the same search results page that would have been generated if the at least one query term had been entered into the at least one web site, and the at least one web site had generated the at least one address query string.

2. A method for using a software application to make an information portal distinct from the application display search results, the information portal allowing entry of query terms, generating corresponding address query strings to retrieve the search results for display by the information portal, the address query strings including the query terms and additional terms specific to the information portal, the method of using the application comprising:

receiving, in the software application, a query term for which results are to be displayed by the information portal;

generating, in the software application, an address query string including the query term, the address query string being generated from a query string template identifying a query term location and including the additional terms specific to the information portal;

communicating the address query string to the information portal; and displaying the search results generated by the information portal based on the address query string;

wherein the search results displayed by the information portal are the same search results that would have been displayed if the query term had been entered into the information portal, and the information portal had generated the address query string.

3. A method of training a software application to make a separate information portal display search results:

having the software application teach itself a query term location and additional terms specific to the information portal from an address query string generated by the information portal in response to entry of a query term;

generating, in the software application, a query string template based on the query term location and additional terms specific to the information portal; and storing the query string template for subsequent use by the software application in making the information portal display the search results;

wherein the query string template is usable by the software application to generate another address query string for communication to the information portal based on another query term received in the software application, such that the information portal will display the same search results in response to the receipt of the address query string generated by the software application as would be displayed if the query term entered into the software application had been entered into the information portal, and the information portal had generated the address query string.

4. The method of claim 1, wherein:

receiving the selection of at least one of the plurality of websites includes receiving the selection of multiple web sites;

generating the at least one address query string includes generating multiple address query strings, each address query string corresponding to a respective one of the multiple web sites selected and including the at least one query term and additional terms specific to the respective one of the multiple web sites selected;

communicating the at least one address query string includes communicating the multiple address query strings to the respective web sites; and displaying the search results page of the at least one web site includes displaying multiple search results pages generated by the multiple websites in response to the multiple address query strings.

5. The method of claim 1, further comprising a preliminary step of:

generating a plurality of query string templates, each query string template corresponding to a respective one of the plurality of web sites and identifying at least one query term location and including the additional terms specific to the respective web site;

wherein the at least one address query string for the at least one web site selected is generated based on the query string templates corresponding to the at least one web site selected.

6. The method of claim 1, wherein the plurality of web sites includes at least one on-line store web site.

7. The method of claim 1, wherein the plurality of web sites includes at least one search engine web site.

8. The method of claim 1, further comprising:

receiving a web site category designation from a user; and allowing a user to associate at least one of the plurality of web sites with the web site category designation.

9. The method of claim 2, further comprising a preliminary step of receiving, in the application, a selection of the information portal from among a plurality of other information portals.

10. The method of claim 2, further comprising a preliminary step of generating the address query string template.

11. The method of claim 2, wherein the information portal is a web site.

12. The method of claim 2, wherein the application is incorporated into a web browser.

13. The method of claim 3, further comprising a preliminary step of prompting a user to enter the query term into the information portal.

14. The method of claim 3, further comprising:

prompting the user to enter a name for the information portal; and associating the query string template with the name.

15. The method of claim 5, wherein generating each of the plurality of query string templates includes:

prompting a user to enter at least one predetermined query term into the respective one of the web sites;

identifying the at least one query term location and the additional terms specific to the respective one of the web sites from an address query string generated by the respective one of the web sites in response to entry of the at least one predetermined query term.

16. The method of claim 10, wherein generating the address query string template includes:

prompting a user to enter a predetermined query term into the information portal; and identifying the query term location and the additional terms specific to the information portal from an address query string generated by the information portal in response to entry of the predetermined query term.

17. The method of claim 11, wherein displaying the search results from the information portal includes displaying a search results page generated by the web site.

18. The method of claim 13, further comprising additional preliminary steps of:

prompting a user for a location identifier for the information portal; and automatically displaying the information portal to the user based on the location identifier.

19. The method of claim 18, wherein the information portal is a web address, the location identifier is a web address, and automatically displaying the information portal to the user based on the location identifier includes automatically opening a web browser and navigating to the web address.

* * * * *